US008122386B2

(12) United States Patent
Kobayashi

(10) Patent No.: US 8,122,386 B2
(45) Date of Patent: Feb. 21, 2012

(54) DUMMY PATTERN PLACEMENT APPARATUS, METHOD AND PROGRAM AND SEMICONDUCTOR DEVICE

(75) Inventor: Naohiro Kobayashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 783 days.

(21) Appl. No.: 12/222,600

(22) Filed: Aug. 12, 2008

(65) Prior Publication Data

US 2009/0049420 A1 Feb. 19, 2009

(30) Foreign Application Priority Data

Aug. 16, 2007 (JP) .............................. 2007-212360

(51) Int. Cl.
*G06F 17/50* (2006.01)
(52) U.S. Cl. ................ 716/50; 716/53; 716/54; 716/55; 716/119
(58) Field of Classification Search .............. 716/50–56, 716/119
See application file for complete search history.

(56) References Cited

U.S. PATENT DOCUMENTS

| 2003/0001155 A1* | 1/2003 | Kotani et al. ................... 257/48 |
| 2004/0243967 A1 | 12/2004 | Yamagiwa et al. |
| 2005/0076320 A1* | 4/2005 | Maeda ............................ 716/10 |
| 2007/0168898 A1* | 7/2007 | Gupta et al. ..................... 716/9 |

FOREIGN PATENT DOCUMENTS

| JP | 2001-100390 | 4/2001 |
| JP | 2001-230250 | 8/2001 |
| JP | 2004-354605 | 12/2004 |

* cited by examiner

*Primary Examiner* — Paul Dinh
(74) *Attorney, Agent, or Firm* — McGinn IP Law Group PLLC

(57) ABSTRACT

The load of OPC processing (especially, the load of bias processing) has been increasing due to optical effects involved in the placement of a dummy pattern. A pattern placement apparatus places dummy patterns in a layout region where a plurality of wiring patterns is placed. The pattern placement apparatus comprises: a placement region setting section that sets a placement region, where each of the dummy patterns should be placed, in an intermediate region between the adjacent wiring patterns at substantially constant intervals to the adjacent writing patterns; and a pattern placement section that places the dummy pattern in the placement region.

1 Claim, 23 Drawing Sheets

DUMMY PATTERN PLACEMENT APPARATUS, METHOD AND PROGRAM AND SEMICONDUCTOR DEVICE

BACKGROUND OF THE INVENTION

1. Field of the Invention

The present invention relates to a dummy pattern placement apparatus, method and program, and a semiconductor device. In particular, the present invention relates to a dummy pattern placement apparatus, method and program capable of simplifying OPC (Optical Proximity Correction) processing, and a semiconductor device.

2. Description of the Related Art

In recent years, in semiconductor devices, multi-layering of a wiring layer has been making progress. If a plurality of wiring layers are deposited one after another, the upper wiring layer is affected more by the unevenness in the surfaces of lower wiring layers. If this effect is large, even disconnection may occur in the wiring of a wiring layer formed in the upper layer. Moreover, a disconnection of wiring may occur due to the local unevenness even in the same wiring layer. In order to solve this problem, there is known a technique in which a dummy pattern is placed so as not to overlap with a wiring pattern. Note that the dummy pattern is placed also in order to make uniform the layer thickness of the wiring layer and prevent a variation in the wiring resistance other than in order to prevent the disconnection of the wiring. Although the dummy pattern may be set to have a power supply potential, it is typically set to be floating (a state where the dummy pattern is connected nowhere).

Moreover, the reduction of the distance between wirings has also been making progress. Then, in order to address a problem that the accuracy of pattern shape cannot be secured due to the effect of interference of light incident through a photomask, the OPC processing (optical proximity correction processing) is carried out on layout data after pattern placement. In the OPC processing, a hammerhead pattern is placed in an end part of a pattern, or the width of a pattern is thickened or thinned. Hereinafter, the process of thickening or thinning the width of a pattern is called bias processing.

Japanese Patent Application Publications Nos. 2001-230250 and 2004-354605 describe the placement of a dummy pattern. Japanese Patent Application Publication No. 2001-230250 discloses a technique, in which a dummy pattern is placed near both sides of pattern end parts in order to prevent occurrence of a variation in line end parts during etching. Japanese Patent Application Publication No. 2004-354605 discloses a technique, in which a dummy pattern is placed around a wiring pattern to add a hammerhead pattern according to a certain rule. In addition, Japanese Patent Application Publication No. 2001-100390 discloses a technique related to the pattern correction of an exposure mask.

As described above, a dummy pattern needs to be placed in order to secure the reliability of a semiconductor device. In this case, the OPC processing needs to be carried out on the wiring pattern in consideration of the placed dummy pattern, however, depending on the form of placement of the dummy pattern, especially the work load of the bias processing increases significantly or the time required for the bias processing is prolonged.

For example, in the case where fine dummy patterns are irregularly placed beside a long wiring pattern, the distances between the dummy patterns and the wiring pattern are relatively irregular, and thus the data amount of a table that stores the correction values of the bias processing increases.

Thus, the load of the OPC processing (especially, the load of the bias processing) has been increasing due to the optical effects involved in the placement of the dummy pattern.

SUMMARY

The present invention seeks to solve one or more of the above problems, or to improve upon those problems at least in part. In one embodiment, a dummy pattern placement apparatus according to the present invention is the dummy pattern placement apparatus that places dummy patterns in a layout region where a plurality of wiring patterns are placed, the apparatus comprising: a placement region setting section that sets a placement region, where each of the dummy patterns should be placed, in an intermediate region between the adjacent wiring patterns, at substantially constant intervals to the adjacent wiring patterns; and a pattern placement section that places the dummy pattern in the placement region.

A predetermined distance is maintained from the adjacent wiring patterns and the dummy pattern is placed midway therebetween, thereby equalizing the optical effect on the wiring pattern, the optical effect being involved in the placement of the dummy pattern. This may simplify the bias processing that considers the optical effect of the dummy pattern.

In second embodiment, a dummy pattern placement method according to the present invention is the dummy pattern placement method for placing a dummy pattern in a layout region, where a plurality of wiring patterns are placed, with the use of a computer, the method comprising the steps of: setting a placement region, where the dummy pattern should be placed, in an intermediate region between the adjacent wiring patterns, at substantially constant intervals to the adjacent wiring patterns; and placing the dummy pattern in the placement region.

In another embodiment, a semiconductor device according to the present invention is the semiconductor device comprising: a plurality of island-shaped wiring patterns extending along a first axis line; and a plurality of island-shaped dummy patterns extending along the first axis line, in which each of the plurality of dummy patterns is placed in an intermediate region between the adjacent wiring patterns, and in which intervals each between the dummy pattern placed in the intermediate region and the adjacent wiring pattern on either side of the dummy pattern are substantially constant across a layout region.

According to the present invention, the OPC processing (in particular, the bias processing) that considers the optical effect of the dummy pattern can be simplified.

BRIEF DESCRIPTION OF THE DRAWINGS

The above and other objects, advantages and features of the present invention will be more apparent from following description of certain preferred embodiments taken in conjunction with the accompanying drawings, in which.

DESCRIPTION OF THE PREFERRED EMBODIMENTS

Figure 1:
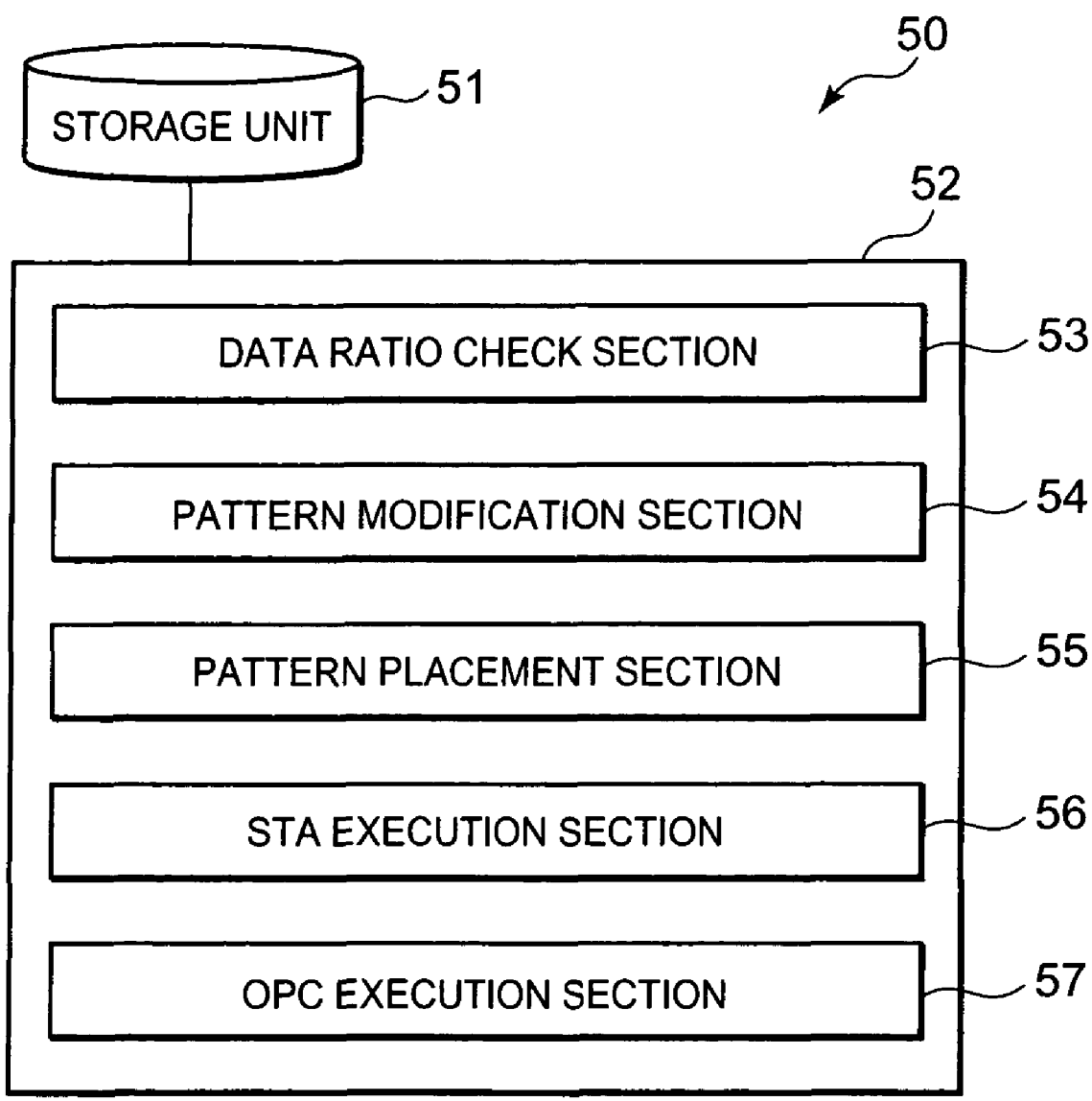
FIG. 1 is a schematic diagram for illustrating the configuration of a pattern placement apparatus according to a first embodiment of the present invention.

Hereinafter, the embodiments of the present invention will be described with reference to the accompanying drawings. Note that each embodiment is simplified for the purpose of description. Since the drawings are simplified ones, the technical scope of the present invention shall not be narrowly interpreted in accordance with those shown in the accompanying drawings. The same reference numeral is given to the same element to omit the duplicating description. In principle, the words implying the directions, such as up, down, left, and right, are used viewing the drawing from the front.

First Embodiment

Figure 2:
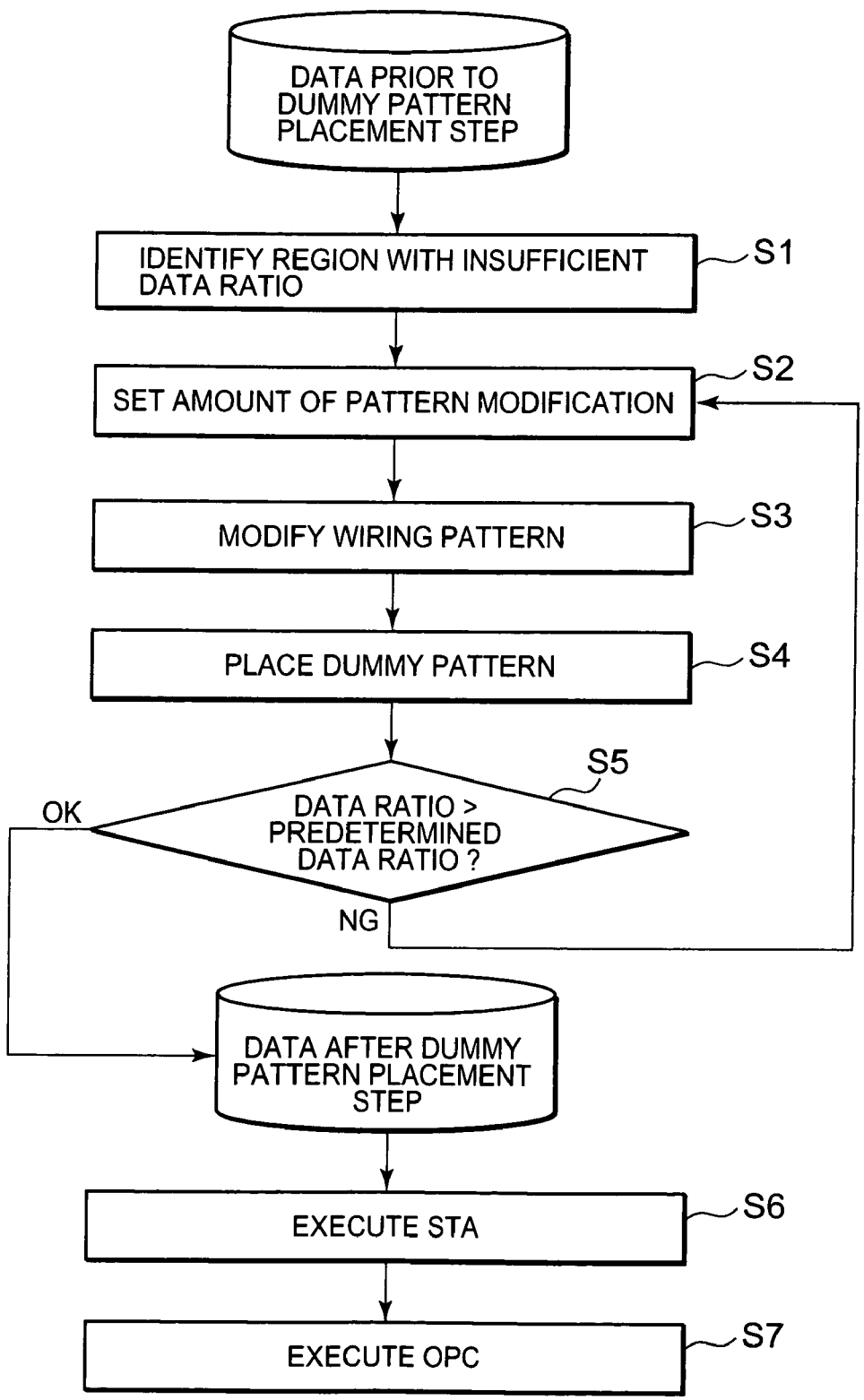
FIG. 2 is a flowchart for illustrating the operation of the pattern placement apparatus according to the first embodiment of the present invention.
Figure 3:
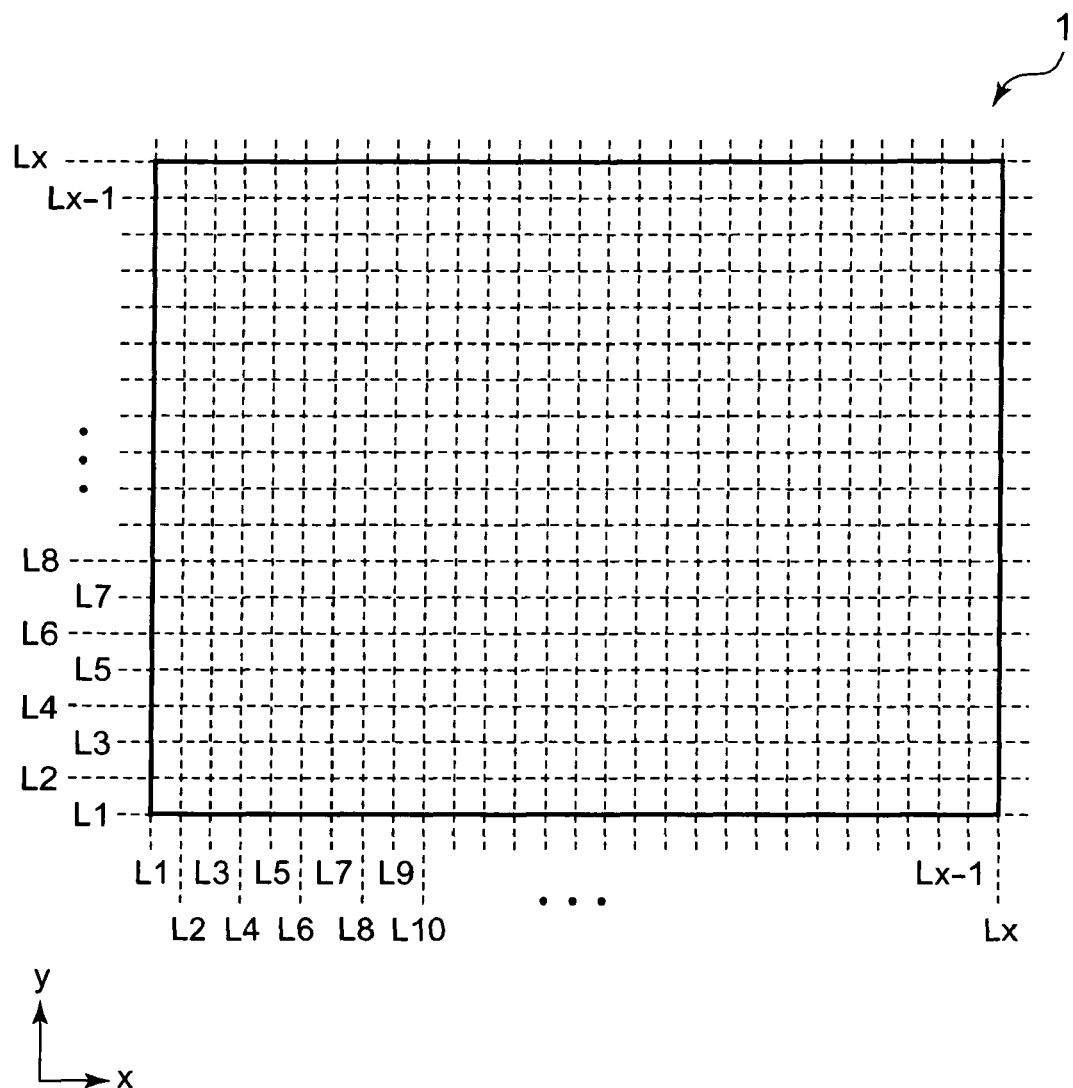
FIG. 3 is an explanatory view for illustrating the operation of a data ratio check section according to the first embodiment of the present invention.

A first embodiment of the present invention will be described with reference to FIG. 1 to FIG. 10. FIG. 1 is a schematic diagram for illustrating the configuration of a pattern placement apparatus. FIG. 2 is a flowchart for illustrating the operation of the pattern placement apparatus. FIG. 3 is an explanatory view for illustrating the operation of a data ratio check section. FIG. 4 to FIG. 10 are explanatory views for illustrating the operation of the pattern placement apparatus.

As shown in FIG. 1, a pattern placement apparatus (dummy pattern placement apparatus) 50 is a computer comprising a storage unit 51 and a processing unit 52. The processing unit 52 comprises a data ratio check section 53, a pattern modification section (placement region setting section) 54, a pattern placement section 55, an STA (Static Timing Analysis) execution section 56, and an OPC (Optical Proximity Correction) execution section 57.

Elements, such as layout data, a wiring rule, and various kinds of tables (a table in which correction values for the bias processing are stored, a scale factor store table (to be described later), and the like) are stored in the storage unit 51. The processing unit 52 reads the layout data stored in the storage unit 51, and places a dummy pattern in a layout region as described later. In addition, the layout data after the dummy pattern placement is stored in the storage unit 51.

The data ratio check section 53 checks if the data ratio of a pattern placed in the layout region satisfies a predetermined data ratio. The pattern modification section 54 modifies the size of a pattern placed in the layout region. The pattern placement section 55 places a pattern in the layout region. The STA execution section 56 conducts a timing analysis (STA (Static Timing Analysis)) on the basis of the layout data after the dummy pattern placement, and calculates the propagation delay of a signal. The OPC execution section 57 performs the optical proximity correction (OPC), thereby adding a hammerhead pattern to a pattern of the layout data or performing the bias processing that considers the effect of the optical proximity effect. The bias processing is performed in consideration of not only the effect of the optical proximity effect but also an effect of the etching effect.

Note that, the functions of the data ratio check section 53, pattern modification section 54, pattern placement section 55, STA execution section 56, and OPC execution section 57, and the like are achieved by the instructions of a program being sequentially executed by an arithmetic processing unit. In addition, the program itself may be stored in the storage unit 51 or may be stored in other storage media (memory or the like).

Hereinafter, appropriately referring to FIG. 2 to FIG. 10, the placement operation of a dummy pattern of the pattern placement apparatus 50 will be described.

As shown in FIG. 2, data before dummy pattern placement is prepared, first. Here, the data ratio check section 53 reads from the storage unit 51 layout data (data prior to the dummy pattern placement step) in which wiring patterns are placed in a layout region.

Next, the data ratio check section 53 checks if the data ratio for each unit region is no less than a predetermined data ratio, and thereby identifies a region with an insufficient data ratio (S1). Note that the data ratio is equal to the occupation ratio of a pattern in a certain region. Moreover, as apparent from the description below, the unit region represents an individual region, obtained by segmenting the whole layout region.

The operation of the data ratio check section 53 is described with reference to FIG. 3. A layout region 1 shall be segmented by first axis lines L1-Lx parallel to the x-axis and second axis lines L1-Lx parallel to the y-axis as shown in FIG. 3.

The data ratio check section 53 checks the data ratio for each row with a two-square height (a row defined by L1-L3, a row defined by L2-L4, a row defined by L3-L5, a row defined by L4-L6, a row defined by L5-L7, a row defined by L6-L8, and so on) defined by the first axis lines parallel to the x-axis. Then, the data ratio check section 53 sequentially checks the data ratio of the wiring pattern, for the above-described row, for each unit region of eight squares (a unit region defined by L1-L5, a unit region defined by L2-L6, a unit region defined by L3-L7, a unit region defined by L4-L8, a unit region defined by L5-L9, a unit region defined by L6-L10) defined by the second axis lines parallel to the y-axis. Then, the data ratio check section 53 identifies a region whose data ratio does not satisfy a predetermined data ratio.

Hereinafter, for the purpose of description, assume that the data ratio is insufficient in the unit region identified by the second axis lines L2-L7 in the row defined by the first axis lines L1-L3. Hereinafter, this unit region is referred to as an insufficient region.

Figure 4:
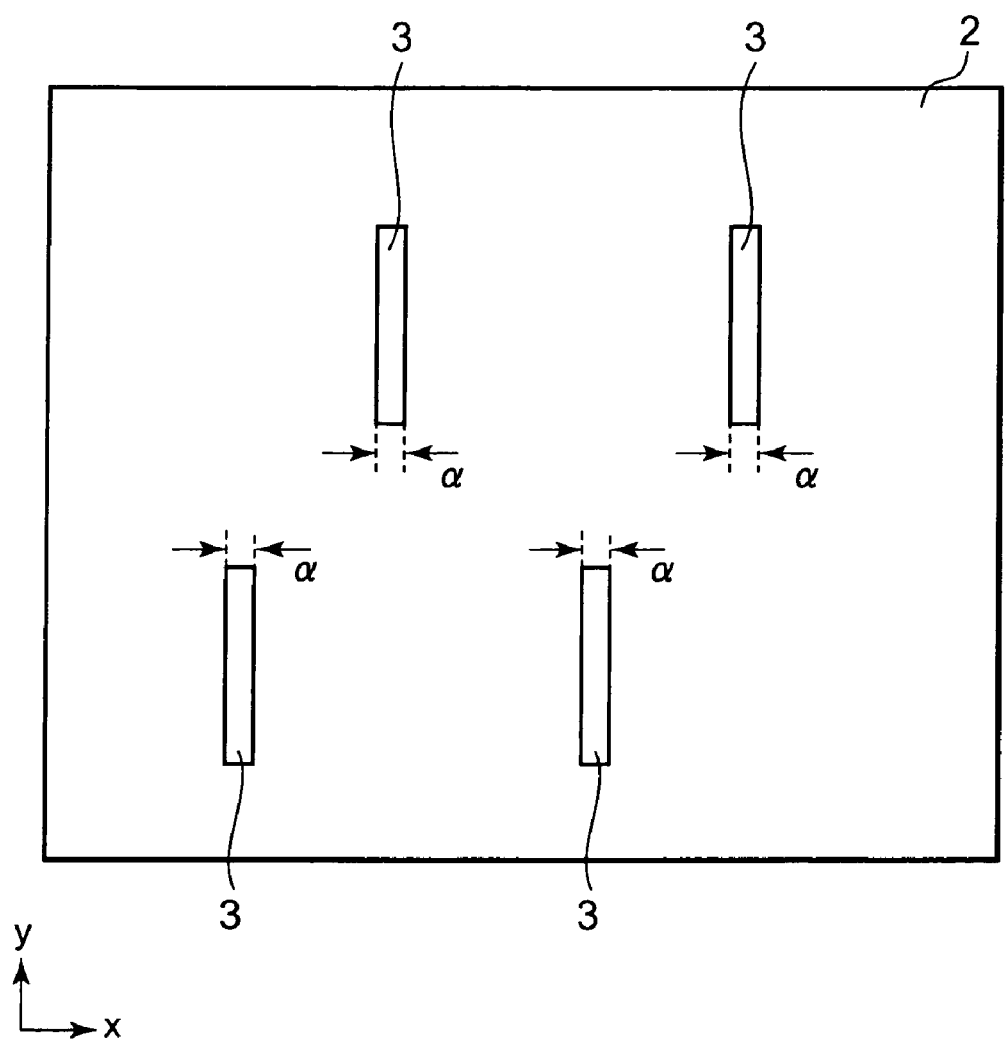
FIG. 4 is an explanatory view for illustrating the operation of the pattern placement apparatus according to the first embodiment of the present invention.

FIG. 4 shows an explanatory view of this insufficient region. As shown in FIG. 4, four wiring patterns 3 are placed in an, insufficient region 2. The wiring pattern 3 is a long island-shaped pattern extending along the y-axis (axis line). In other words, the wiring pattern 3 is a bar-shaped pattern with the y-axis being the longitudinal direction. The width (length along the x-axis) of the wiring pattern 3 is set to $\alpha$ on the basis of a design rule set in the storage unit 51. The interval between the wiring patterns 3 is set to $11\alpha$ ($11 \times \alpha$). Actually, the wiring pattern is identified based on the data, such as the coordinates of an end part, the pattern length, and the pattern width.

Refer back to FIG. 2. Next, the pattern modification section 54 sets the amount of pattern modification (S2). As apparent from the description below, the amount of pattern modification is a value that determines the area of the placement region (setting range of the placement region). Here, a scale factor is employed as the amount of pattern modification.

Specifically, the pattern modification section 54 reads a scale factor from the scale factor store table of the storage unit 51. Here, multiples, i.e., 10×, 8×, 6×, 4×, and 2×, are stored in the scale factor store table. The pattern modification section 54 sequentially sets the placement region in descending order of the magnitude of the scale factor. Thus, the pattern modification section 54 reads 10×, which is the largest one, from the scale factor store table and sets the scale factor as the amount of pattern modification to 10×.

Figure 5:
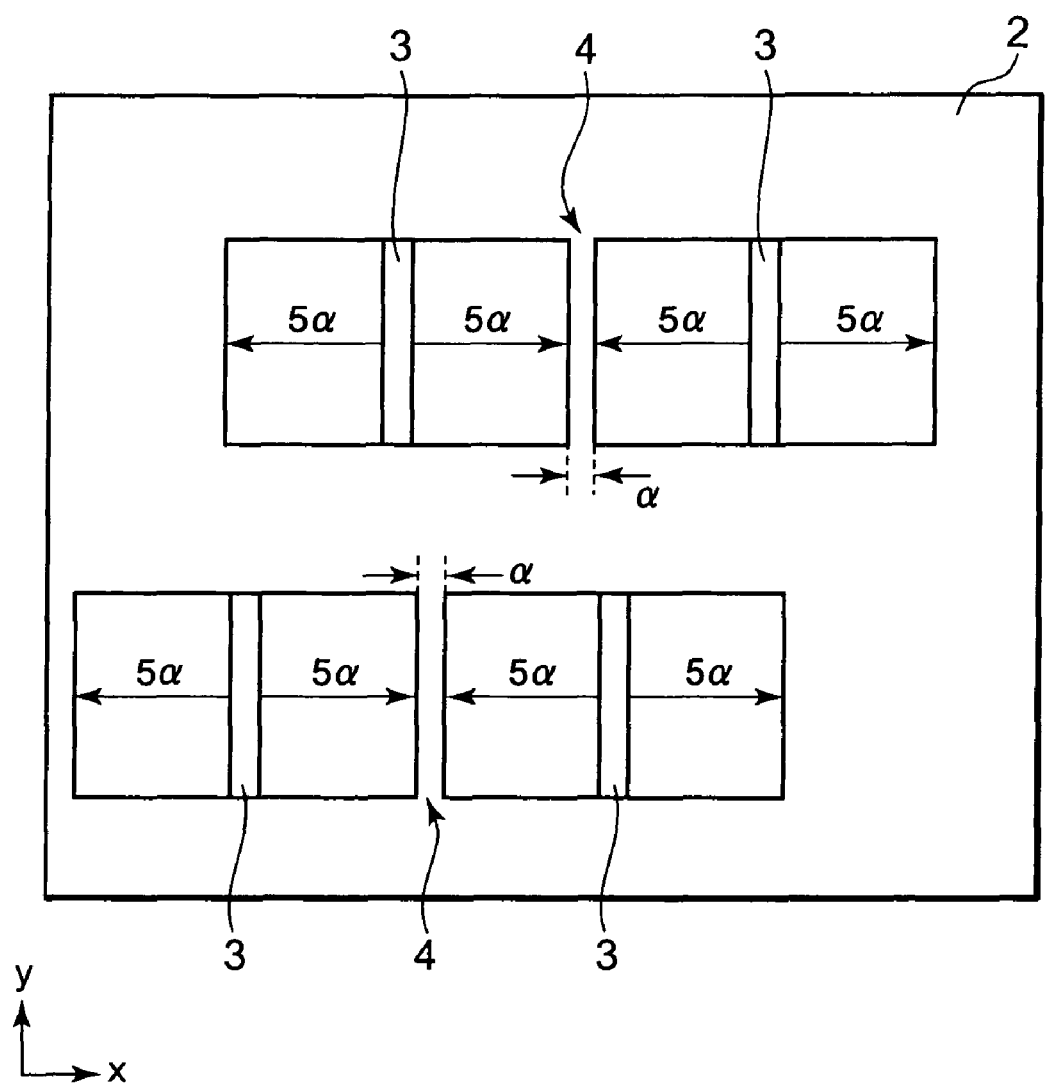
FIG. 5 is an explanatory view for illustrating the operation of the pattern placement apparatus according to the first embodiment of the present invention.

Next, the pattern modification section 54 sets the width of the wiring pattern 3 to 10× and modifies the wiring pattern 3 as illustrated in FIG. 5 (S3). That is, the pattern modification section 54 moves the left side (a first side) of the wiring pattern 3 leftward by $5\alpha$ when looking at the figure, and moves the right side (a second side) of the wiring pattern 3 rightward by $5\alpha$ when looking at the figure. Actually, the width of the wiring pattern 3 is set to be thick based on the coordinate operation.

If the width of the wiring pattern 3 is set large in this manner, then a dummy pattern placement region 4 is set in the intermediate region between the adjacent wiring patterns 3 as illustrated in FIG. 5. Note that the placement region 4 is a region where the placement of a dummy pattern is scheduled (a dummy pattern placement scheduled region), and is identified based on the data, such as the coordinates, the longitudinal width, and the horizontal width. The width along the x-axis of the placement region 4 is $\alpha$. Moreover, the intervals each between the placement region 4 and the adjacent wiring pattern 3 on either side thereof is set to $5\alpha$.

Figure 6:
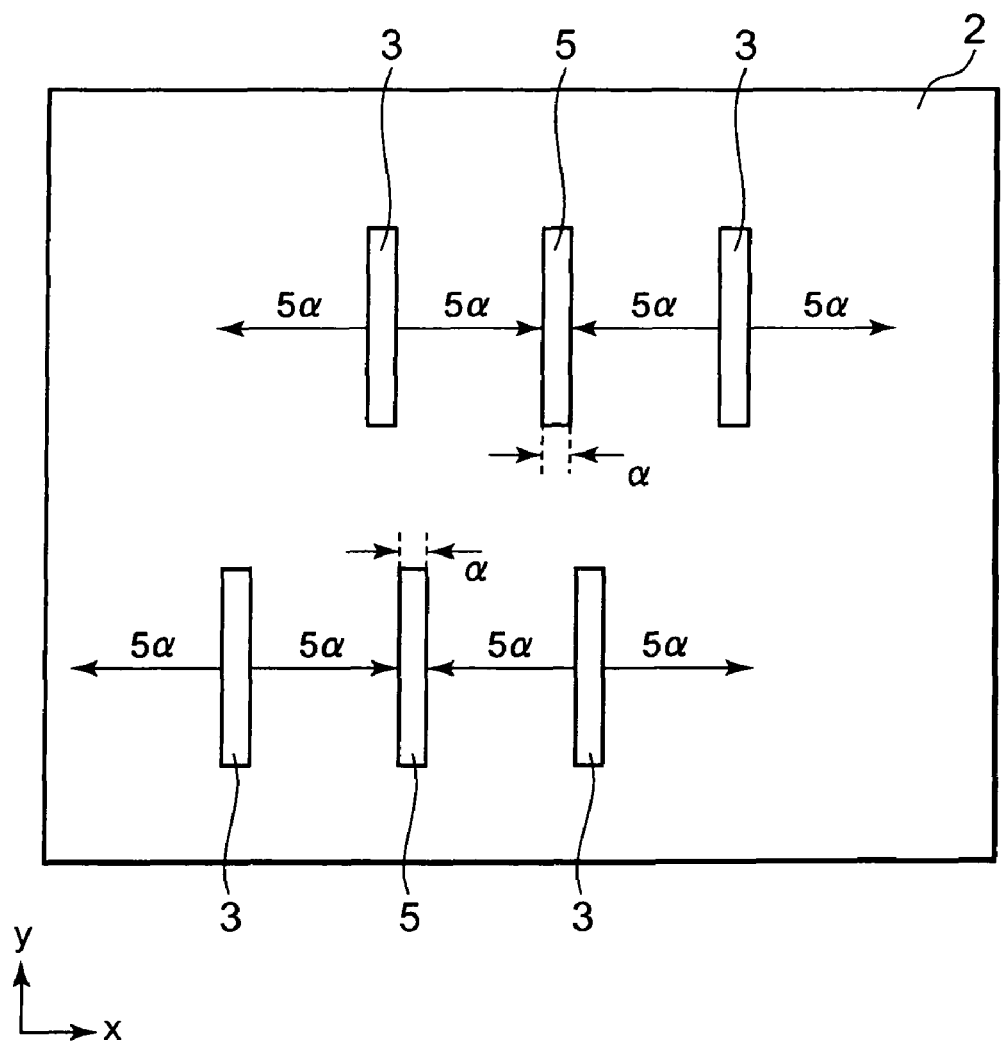
FIG. 6 is an explanatory view for illustrating the operation of the pattern placement apparatus according to the first embodiment of the present invention.

Next, the pattern placement section 55 places a dummy pattern 5 in the placement region 4 as shown in FIG. 6 (S4). Note that the dummy pattern 5 is a long island-shaped pattern that extends along the y-axis like the wiring pattern 3, and extends substantially parallel to the wiring pattern 3. The intervals each between the dummy pattern 5 and the adjacent wiring pattern 3 on either side thereof is set to a substantially constant $5\alpha$. The area of the region occupied by the dummy pattern 5 corresponds to the area of the placement region 4.

Next, the data ratio check section 53 checks the data ratio concerning the insufficient region 2 after the placement of the dummy pattern 5 (S5). Here, even if the dummy pattern 5 of a width $\alpha$ is placed, the data ratio of the insufficient region 2 still does not satisfy a predetermined data ratio. Accordingly, the flow returns to S2 again.

In S2 at the second time, the pattern modification section 54 reads the scale factor 8×, which is the second largest one, from the scale factor store table and sets the scale factor to 8× (S2).

Figure 7:
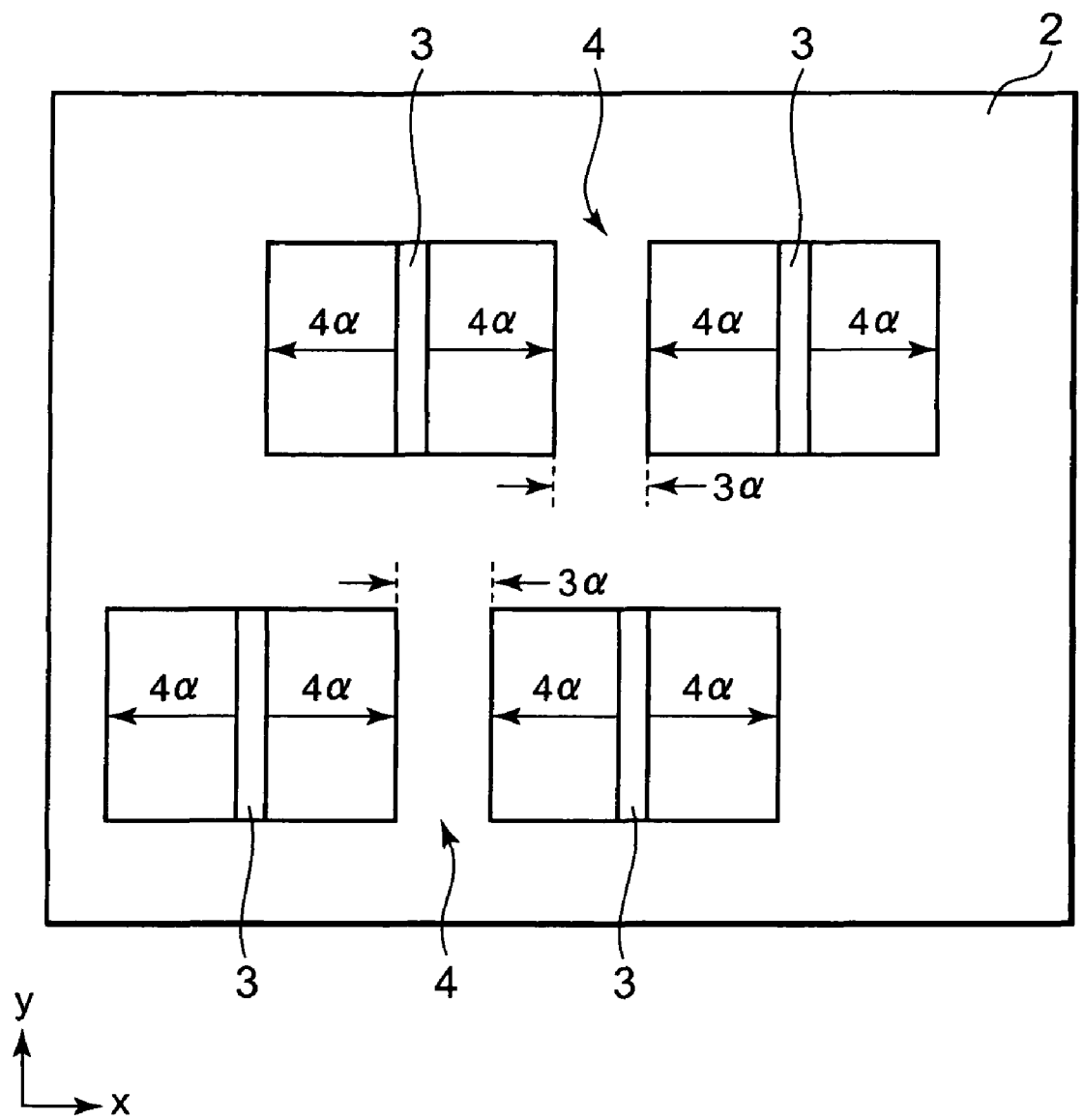
FIG. 7 is an explanatory view for illustrating the operation of the pattern placement apparatus according to the first embodiment of the present invention.

In S3 at the second time, the pattern modification section 54 sets the width of the wiring pattern 3 to 8× to modify the wiring pattern 3 as illustrated in FIG. 7 (S3). That is, the pattern modification section 54 moves the left side of the wiring pattern 3 leftward by $4\alpha$ when looking at the figure, and moves the right side of the wiring pattern 3 rightward by $4\alpha$ when looking at the figure. Actually, the width of the wiring pattern 3 is set to be thick based on the coordinate operation.

If the width of the wiring pattern 3 is set large in this manner, then the dummy pattern placement region 4 is set in the intermediate region between the adjacent wiring patterns 3. Note that the width along the x-axis of the placement region 4 is $3\alpha$. As apparent from the above description, the width of the placement region 4 is set to be wider as the scale factor that determines the area (setting range) of the placement region 4 decreases.

Figure 8:
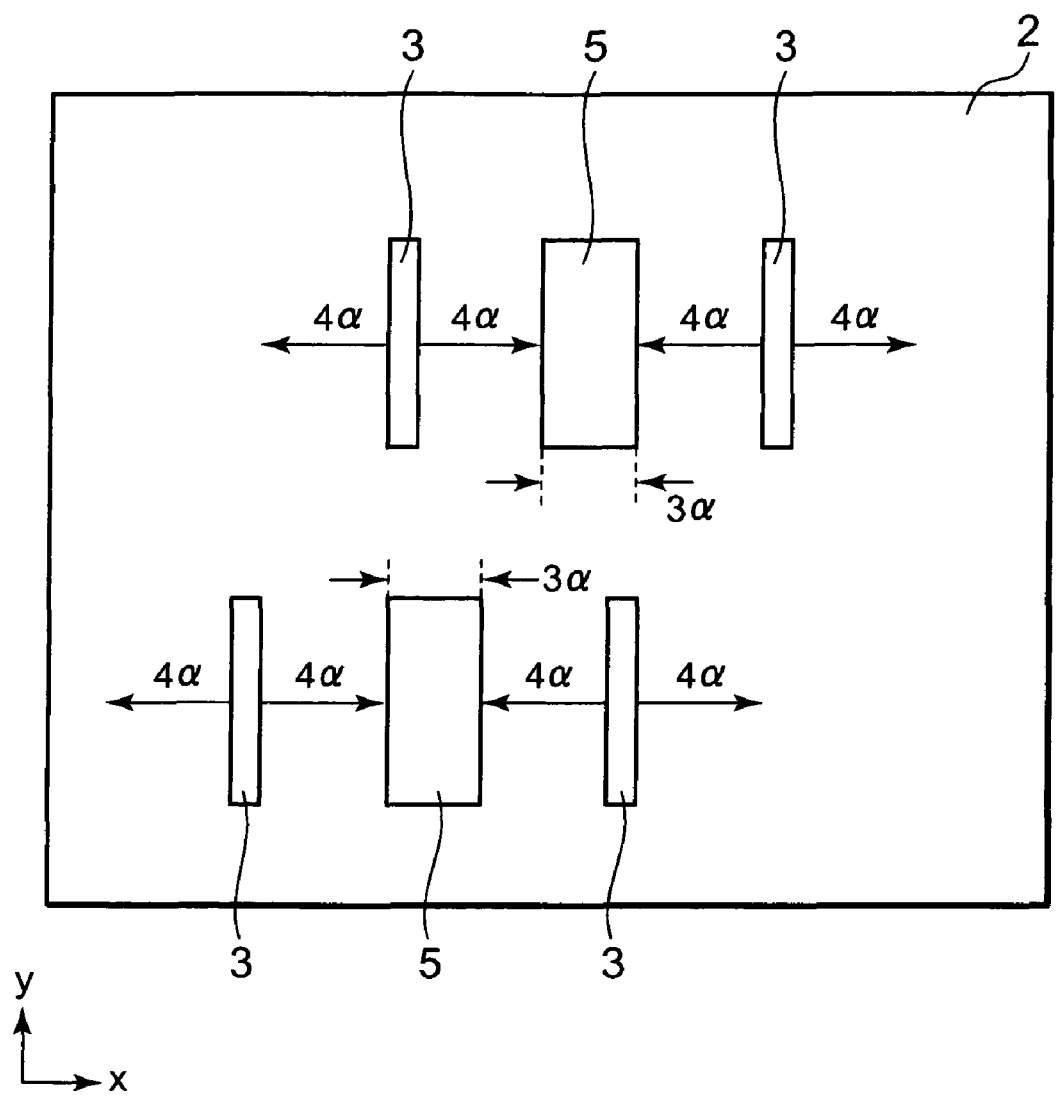
FIG. 8 is an explanatory view for illustrating the operation of the pattern placement apparatus according to the first embodiment of the present invention.

In S4 at the second time, the pattern placement section 55 places the dummy pattern 5 in the placement region 4 as shown in FIG. 8 (S4). The width of this dummy pattern 5 is $3\alpha$. The width of the dummy pattern 5 is set to be thicker as the scale factor that determines the both sides of the placement region 4 decreases.

Next, in S5 at the second time, the data ratio check section 53 checks the data ratio concerning the insufficient region 2 after the placement of the dummy pattern 5 (S5). Here, even if the dummy pattern 5 of a width $3\alpha$ is placed, the data ratio of the insufficient region 2 still does not satisfy a predetermined data ratio. Accordingly, the flow returns to S2 again.

In S2 at the third time, the pattern modification section 54 reads the scale factor 6×, which is the third largest one, from the scale factor store table and sets the scale factor to 6× (S2).

Figure 9:
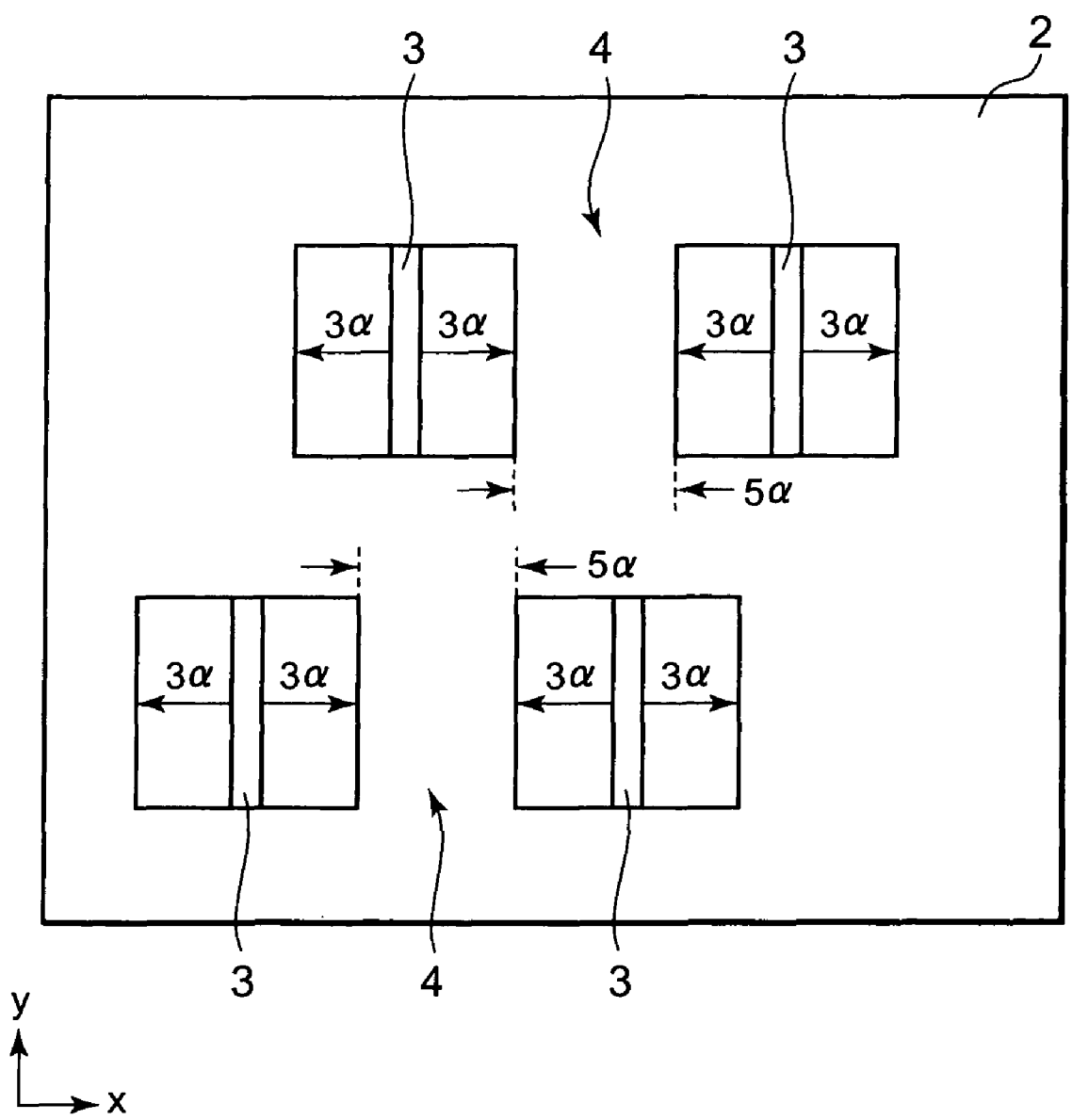
FIG. 9 is an explanatory view for illustrating the operation of the pattern placement apparatus according to the first embodiment of the present invention.

In S3 at the third time, the pattern modification section 54 sets the width of the wiring pattern 3 to 6× to modify the wiring pattern 3 as illustrated in FIG. 9 (S3). That is, the pattern modification section 54 moves the left side of the wiring pattern 3 leftward by $3\alpha$ when looking at the figure, and moves the right side of the wiring pattern 3 rightward by $3\alpha$ when looking at the figure. Actually, the width of the wiring pattern 3 is set to be thick based on the coordinate operation.

If the width of the wiring pattern 3 is set large in this manner, then the dummy pattern placement region 4 is set midway between the adjacent wiring patterns 3. Note that the width along the x-axis of the placement region 4 is 5α. The width of the placement region 4 is set to be wider as the scale factor that determines the area of the placement region 4 decreases.

Figure 10:
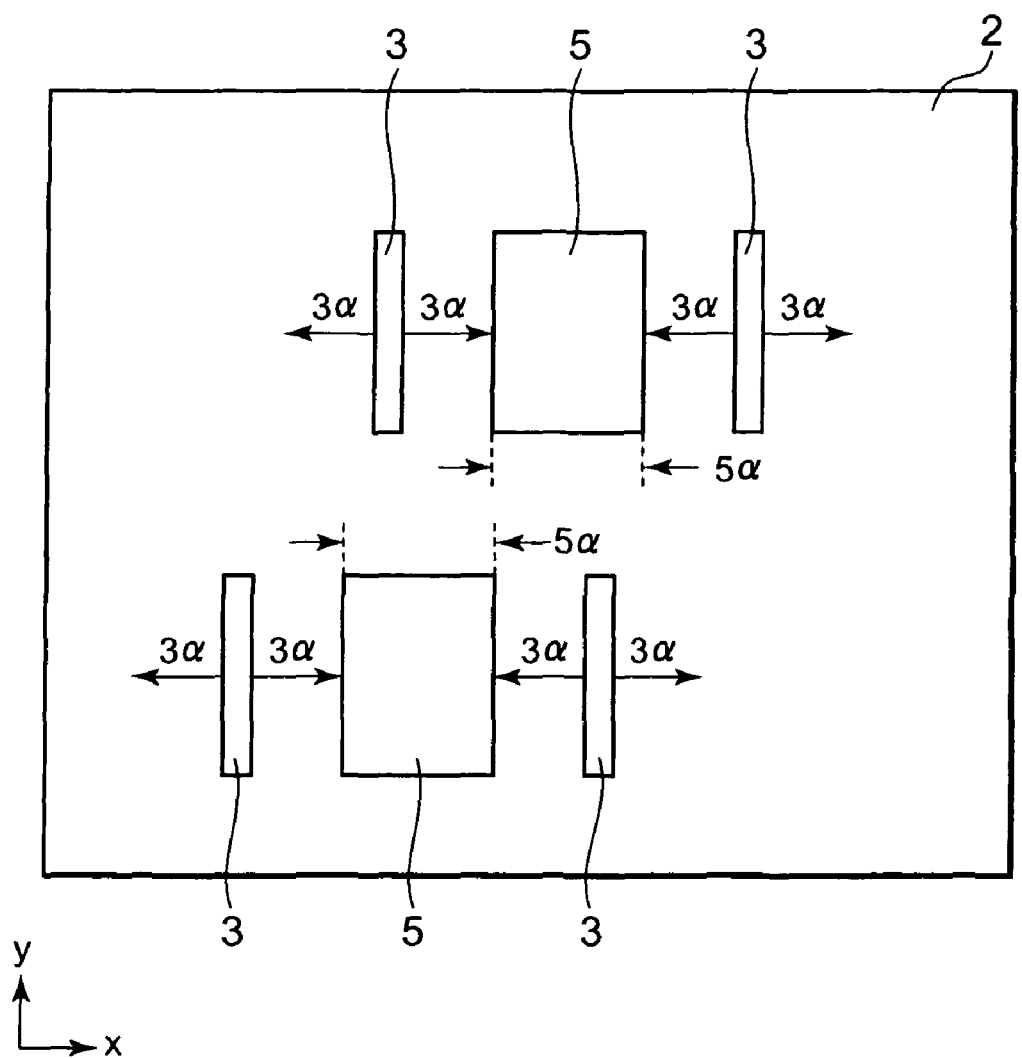
FIG. 10 is an explanatory view for illustrating the operation of the pattern placement apparatus according to the first embodiment of the present invention.

Next, in S4 at the third time, the pattern placement section 55 places the dummy pattern 5 in the placement region 4 as shown in FIG. 10 (S4). The width of this dummy pattern 5 is 5α. The width of the dummy pattern 5 is set to be thicker as the scale factor that determines the both sides of the placement region 4 decreases.

Next, in S5 at the third time, the data ratio check section 53 checks the data ratio concerning the insufficient region 2 after the placement of the dummy pattern 5 (S5). Here, the data ratio of the insufficient region 2 satisfies a predetermined data ratio by placing the dummy pattern 5 of a width 5α. Then, layout data after the dummy pattern placement step is generated.

Finally, the dummy pattern placement apparatus performs the STA on the basis of the layout data in which the dummy pattern is placed (S6), and performs the OPC (S7) as shown in FIG. 2. Moreover, the dummy pattern placement apparatus checks, as required, whether or not the design rule is satisfied. Note that, in the STA processing, the amount of signal delay is calculated based on the capacitance calculation and the like. In the OPC processing, for example, a hammerhead pattern is placed at the end part of a pattern, or the bias processing for thickening or thinning the width of a pattern is performed as described above.

As apparent from the above description, in this embodiment, the dummy pattern 5 is placed in the intermediate region between the adjacent wiring patterns 3 at substantially constant intervals to the adjacent wiring patterns 3. Then, the intervals each between the dummy pattern and one of the adjacent wiring patterns are set substantially constant across the layout region. Accordingly, optical effects in the photolithography process caused by the placement of a dummy pattern can be equalized and the OPC processing (in particular, the bias processing) can be simplified. Moreover, because the variation of the distance between the dummy pattern and the wiring pattern is dissolved, an increase in the data amount of the table, in which correction values for the bias processing are stored, can be suppressed, and the load of the arithmetic processing can be reduced.

Incidentally, the fact that the dummy pattern 5 is placed in the intermediate region between the adjacent wiring patterns 3 at substantially constant intervals to the adjacent wiring patterns 3 is given by the fact that the placement region 4 is set in the intermediate region between the adjacent wiring patterns 3 at substantially constant intervals to the adjacent wiring patterns 3.

Moreover, in this embodiment, since the modification of the dummy pattern is executed in descending order of the magnitude of the scale factor, the dummy pattern can be placed in a region further away from the wiring pattern. Accordingly, the parasitic capacitance itself added to the wiring pattern can be reduced.

As was described at the beginning, the reduction of the distance between patterns is making progress in recent years. Accordingly, during the manufacturing process of semiconductor devices, the patterns may be short-circuited to each other due to dust or the like. If dust adheres to a space between patterns, and the wiring patterns are short-circuited to each other, then a failure of a semiconductor device is incurred. If dust adheres to a space between patterns, and the wiring pattern and the dummy pattern are short-circuited to each other, then an unexpected wiring capacitance and resistance is added to a signal wiring and an unexpected propagation delay of a signal is incurred. In the case where a dummy pattern is connected to a power supply potential (VDD, GND), if dust adheres to a space between patterns, and the wiring pattern and the dummy pattern are short-circuited to each other, then a failure of a semiconductor device may be incurred.

In this embodiment, as described above, a dummy pattern can be placed in a region further away from the wiring pattern. Thus, short-circuit of patterns due to dust can be also prevented effectively.

Moreover, in this embodiment, after checking the data ratio and setting the insufficient region as described in FIG. 3, the cycle from S2 to S5 of FIG. 2 is carried out. In this way, a time required in the dummy pattern placement step can be reduced.

Moreover, in this embodiment, the placement region is set based on thickening the width of the wiring pattern along the x-axis. That is, the width of the wiring pattern is thickened in the direction perpendicular to the extending direction of the wiring pattern. As compared with the case where the width of the wiring pattern is thickened in the extending direction of the wiring pattern (the case where the wiring pattern is set to be a longer one), in this case the dummy pattern can be placed so as to sufficiently compensate for insufficiency of the data ratio.

Moreover, in this embodiment, the dummy pattern placement apparatus comprises the STA execution section and the OPC execution section. In this case, the above-described effect can be implemented in the dummy pattern placement apparatus itself.

Second Embodiment

Figure 11:
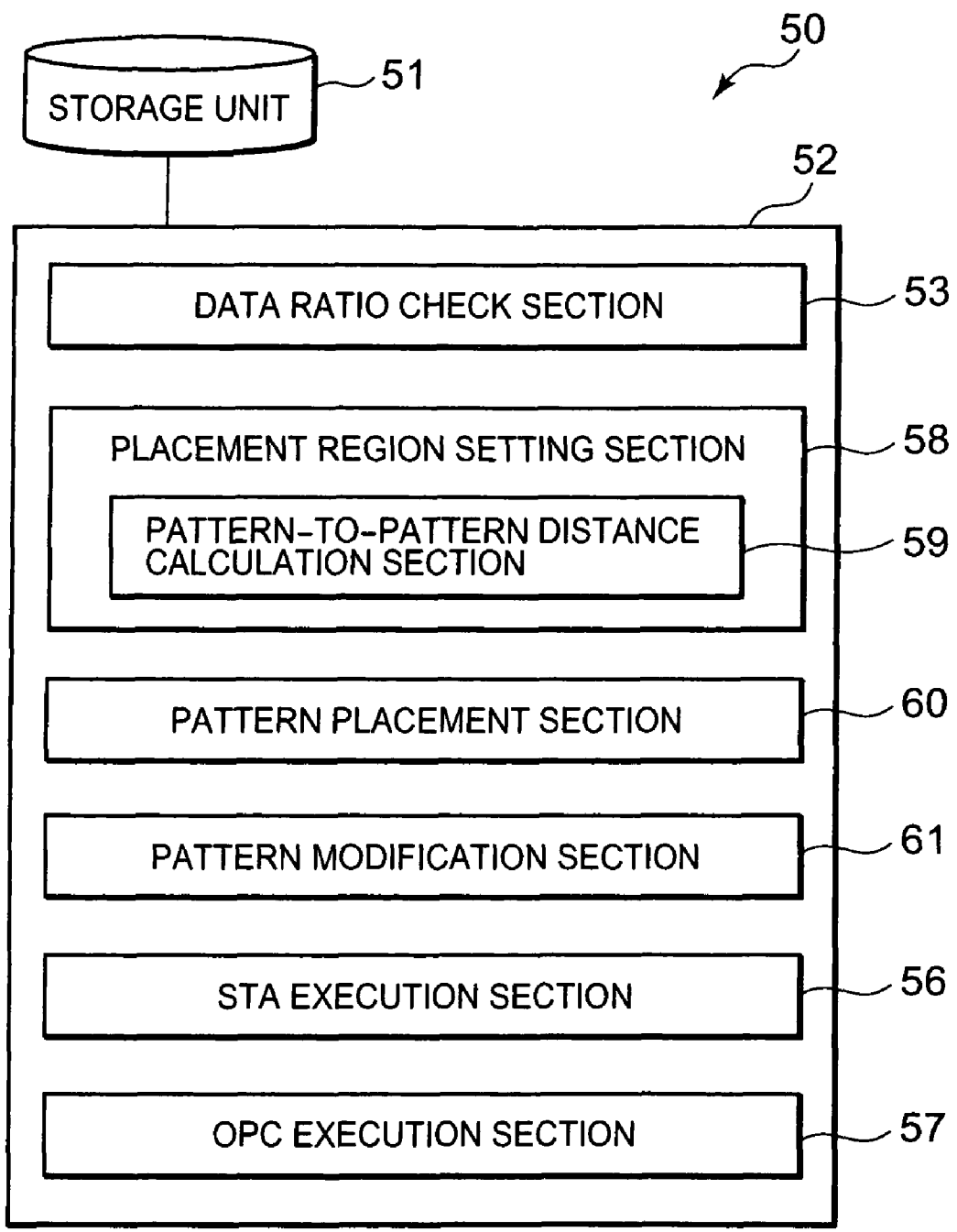
FIG. 11 is a schematic diagram for illustrating the configuration of a pattern placement apparatus according to a second embodiment of the present invention.
Figure 12:
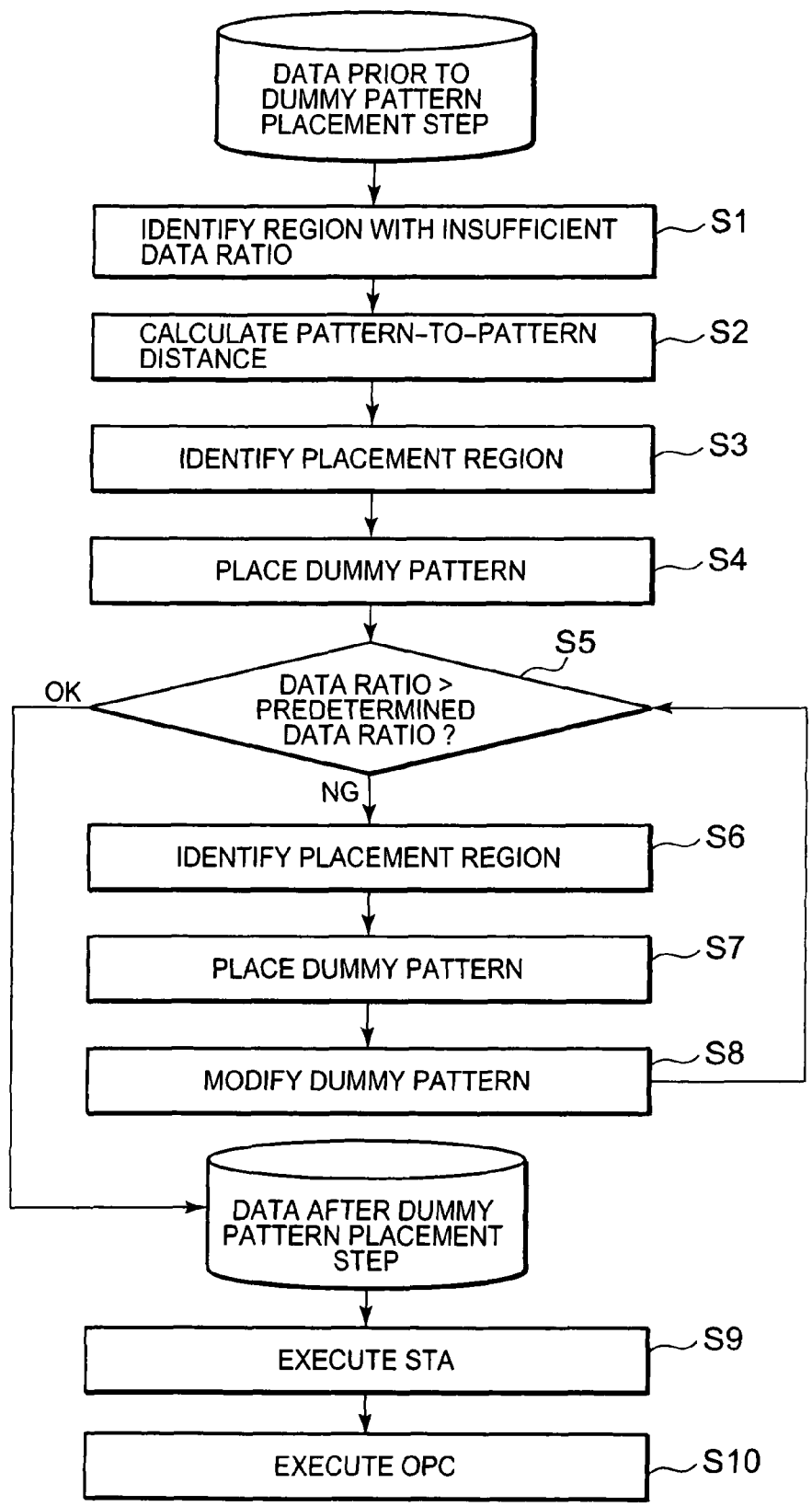
FIG. 12 is a flowchart for illustrating the operation of the pattern placement apparatus according to the second embodiment of the present invention.

A second embodiment of the present invention will be described with reference to FIG. 11 to FIG. 19. FIG. 11 is a schematic diagram for illustrating the configuration of a pattern placement apparatus. FIG. 12 is a flowchart for illustrating the operation of the pattern placement apparatus. FIG. 13 to FIG. 19 are explanatory views for illustrating the operation of the pattern placement apparatus.

As shown in FIG. 11, a pattern placement apparatus 50 according to this embodiment comprises a placement region setting section 58. The placement region setting section 58 comprises a pattern-to-pattern distance calculation section 59 and sets the placement region 4 on the basis of the calculation of a distance between adjacent wiring patterns. The pattern-to-pattern distance calculation section 59 calculates, on the basis of the coordinate information, a distance between patterns placed in a layout region.

The pattern placement apparatus 50 according to this embodiment further comprises a pattern modification section 61 and can modify a dummy pattern placed in the placement region 4.

By employing such configuration, also in this embodiment, as in the first embodiment, the dummy pattern 5 can be placed at substantially constant intervals to the adjacent wiring patterns 3. Then, the intervals each between the dummy pattern 5 and the wiring pattern 3 on either side thereof are set substantially constant in this manner, and thereby the same effect as the effect described in the first embodiment can be obtained (e.g., optical effects in the photolithography process that occur with the placement of a dummy pattern can be equalized, the OPC processing (in particular, the bias processing) can be simplified.)

Hereinafter, appropriately referring to FIG. 12 to FIG. 19, the placement operation of a dummy pattern of the pattern placement apparatus 50 will be described.

As shown in FIG. 12, data before a dummy pattern is placed is prepared, first. Here, the data ratio check section 53 reads from the storage unit 51 layout data (data prior to the dummy pattern placement step) in which a wiring pattern is placed in a layout region.

Next, as in the first embodiment, the data ratio check section 53 checks if the data ratio is no less than a predetermined data ratio, and identifies a region with an insufficient data ratio (S1). Here, assume that the data ratio is insufficient in the same unit region as the one in the first embodiment.

Figure 13:
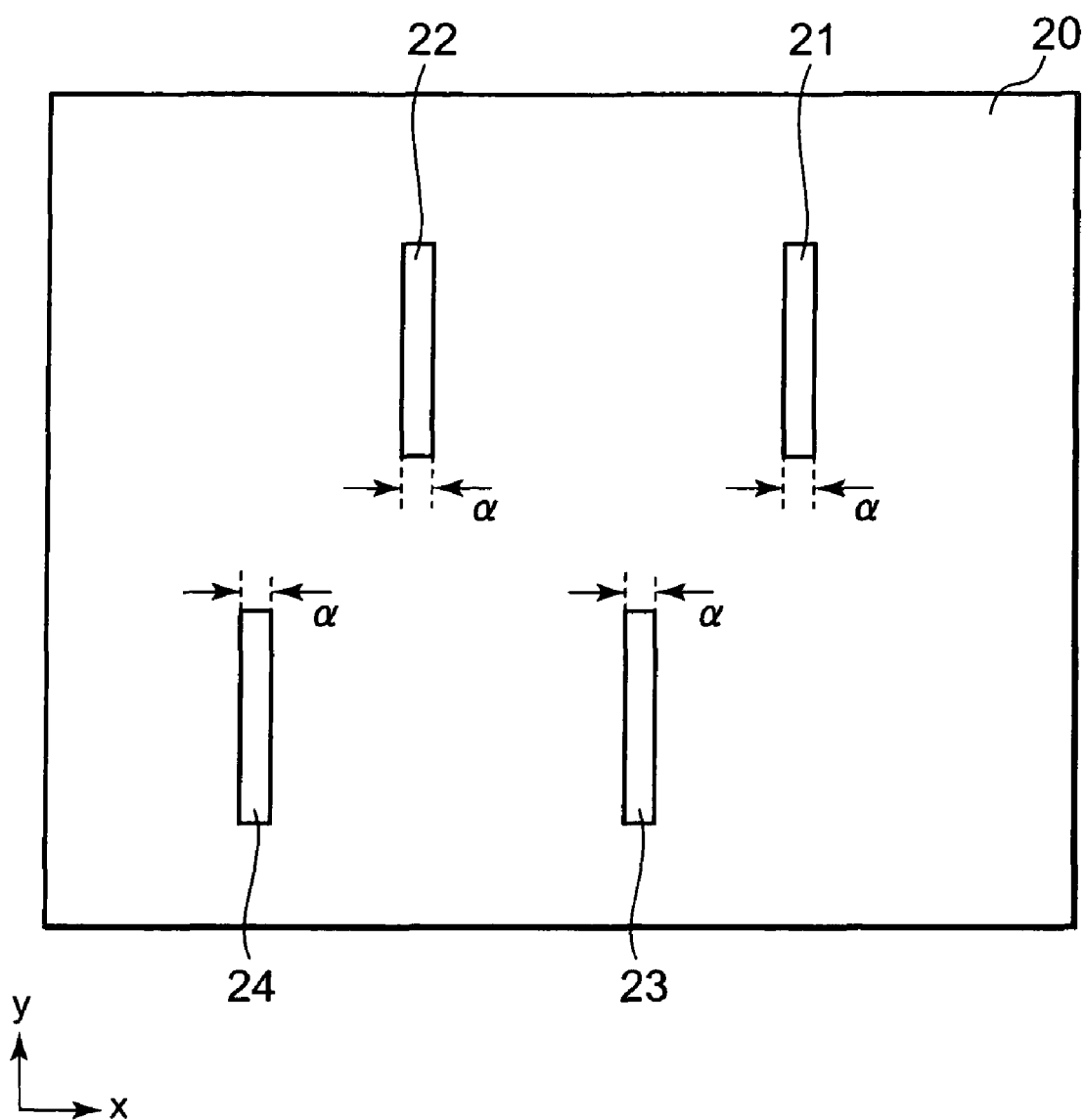
FIG. 13 is an explanatory view for illustrating the operation of the pattern placement apparatus according to the second embodiment of the present invention.

FIG. 13 shows an explanatory view of an insufficient region 20 in this embodiment. As shown in FIG. 13, four wiring patterns 21-24 are placed in the insufficient region 20. The wiring patterns 21-24 are a long island-shaped pattern extending along the y-axis (axis line). The width (length along the x-axis) of the wiring patterns 21-24 is set to $\alpha$ based on the design rule set in the storage unit 51. Actually, the wiring pattern is identified based on the data, such as the coordinates of an end part, the pattern length, and the pattern width.

Figure 14:
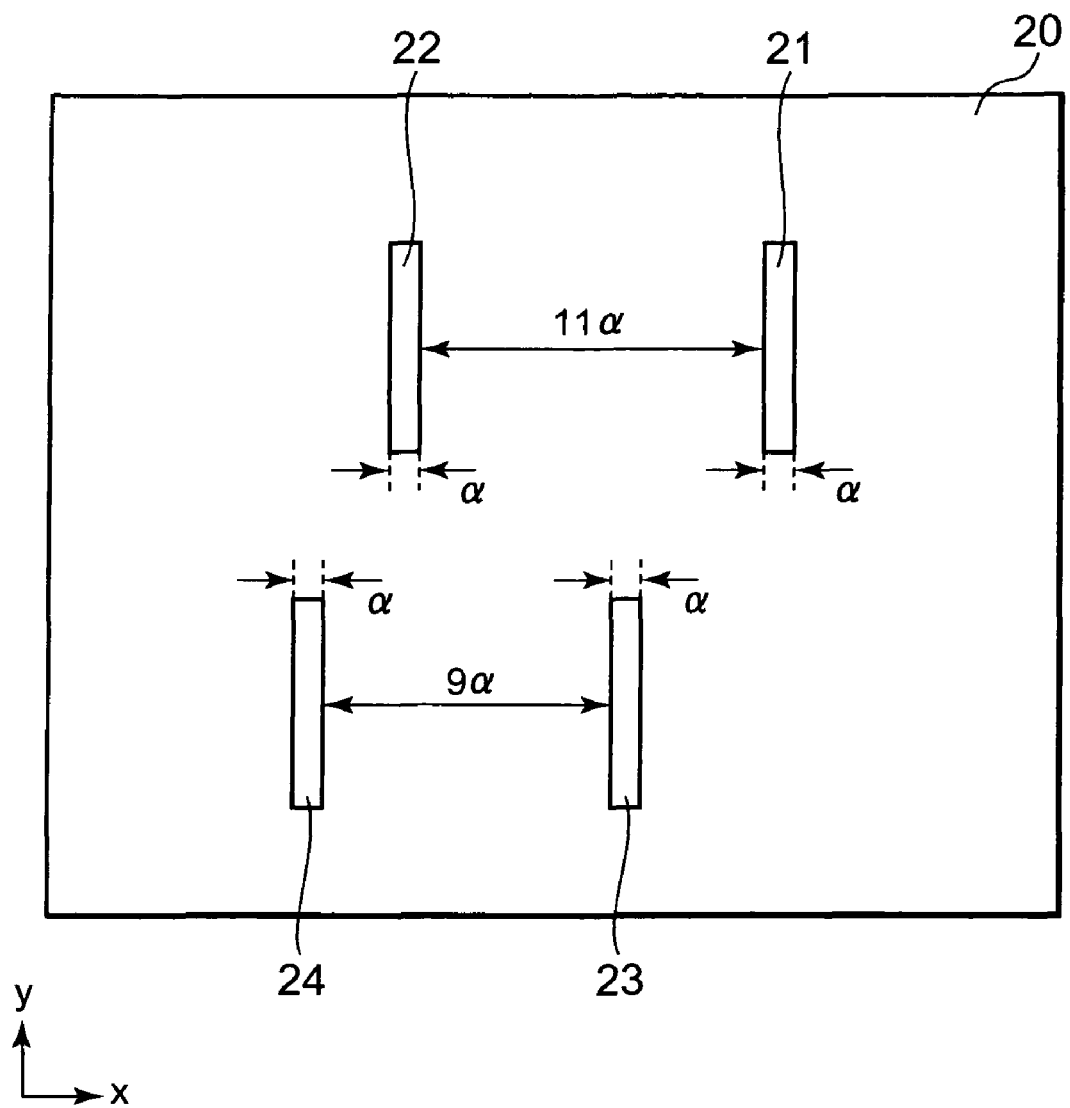
FIG. 14 is an explanatory view for illustrating the operation of the pattern placement apparatus according to the second embodiment of the present invention.

Refer back to FIG. 12. Next, the pattern-to-pattern distance calculation section 59 calculates a distance between the wirings (S2). Specifically, the pattern-to-pattern distance calculation section 59 calculates a distance between adjacent wiring patterns 21, 22 as shown in FIG. 14. Similarly, the pattern-to-pattern distance calculation section 59 calculates a distance between wiring patterns 23, 24. Note that the pattern-to-pattern distance calculation section 59 calculates the distance between the wiring patterns on the basis of the coordinates indicative of the position of each pattern. Here, the distance between the wiring pattern 22 and the wiring pattern 23 is $11\alpha$ ($11\times\alpha$). The distance between the wiring pattern 23 and the wiring pattern 24 is $9\alpha$ ($9\times\alpha$).

Figure 15:
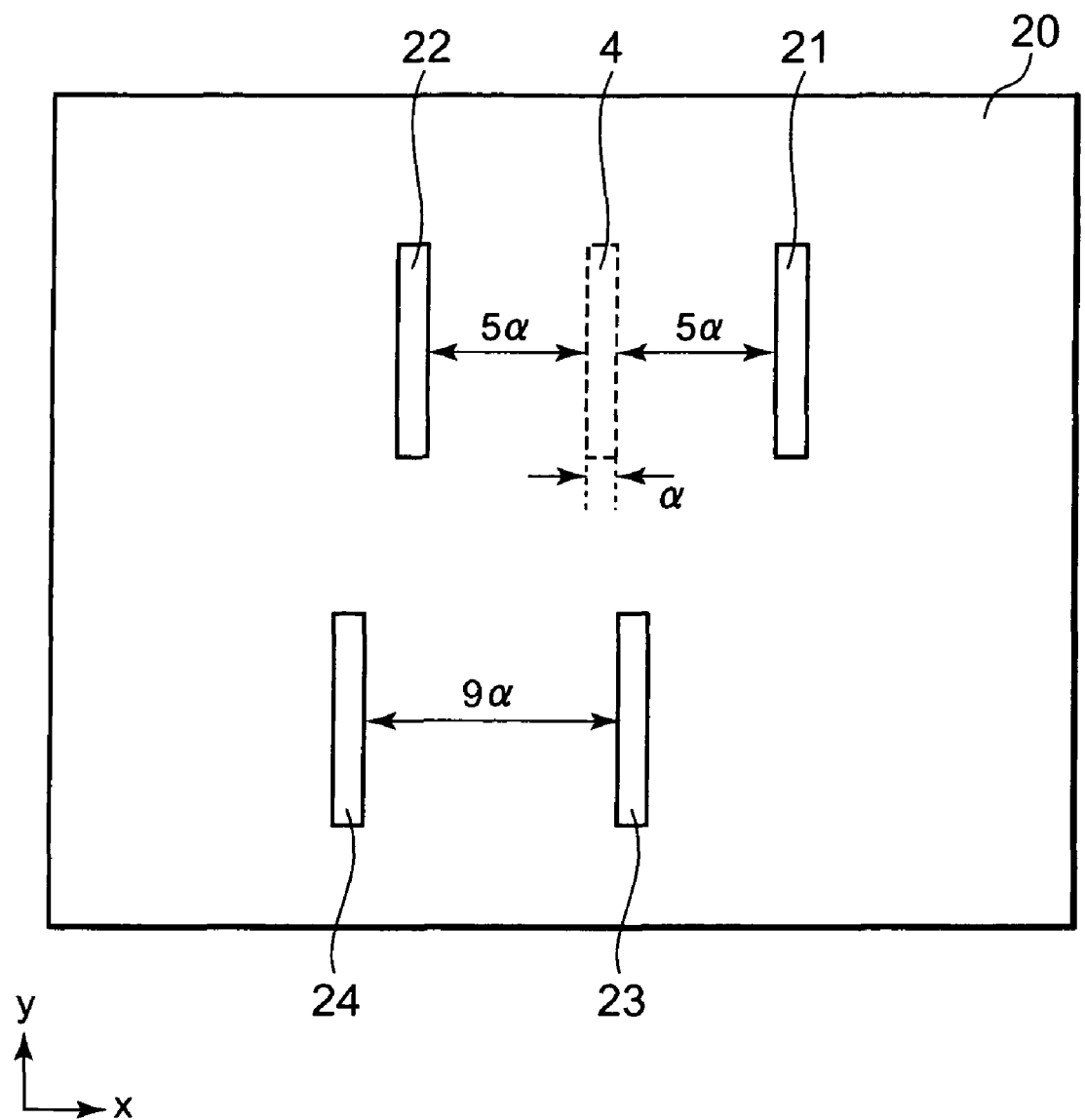
FIG. 15 is an explanatory view for illustrating the operation of the pattern placement apparatus according to the second embodiment of the present invention.

Next, the placement region setting section 58 sets a placement region based on the calculated results (S3). Specifically, the placement region setting section 58 sets the placement region 4 midway between the wiring pattern 21 and the wiring pattern 22 as illustrated in FIG. 15. Moreover, the placement region setting section 58 sets the interval between the placement region 4 and the wiring pattern 21 to $5\alpha$ and sets the interval between the placement region 4 and the wiring pattern 22 to $5\alpha$. Note that the width of the placement region 4 is set to $\alpha$ in accordance with the wiring rule.

Figure 16:
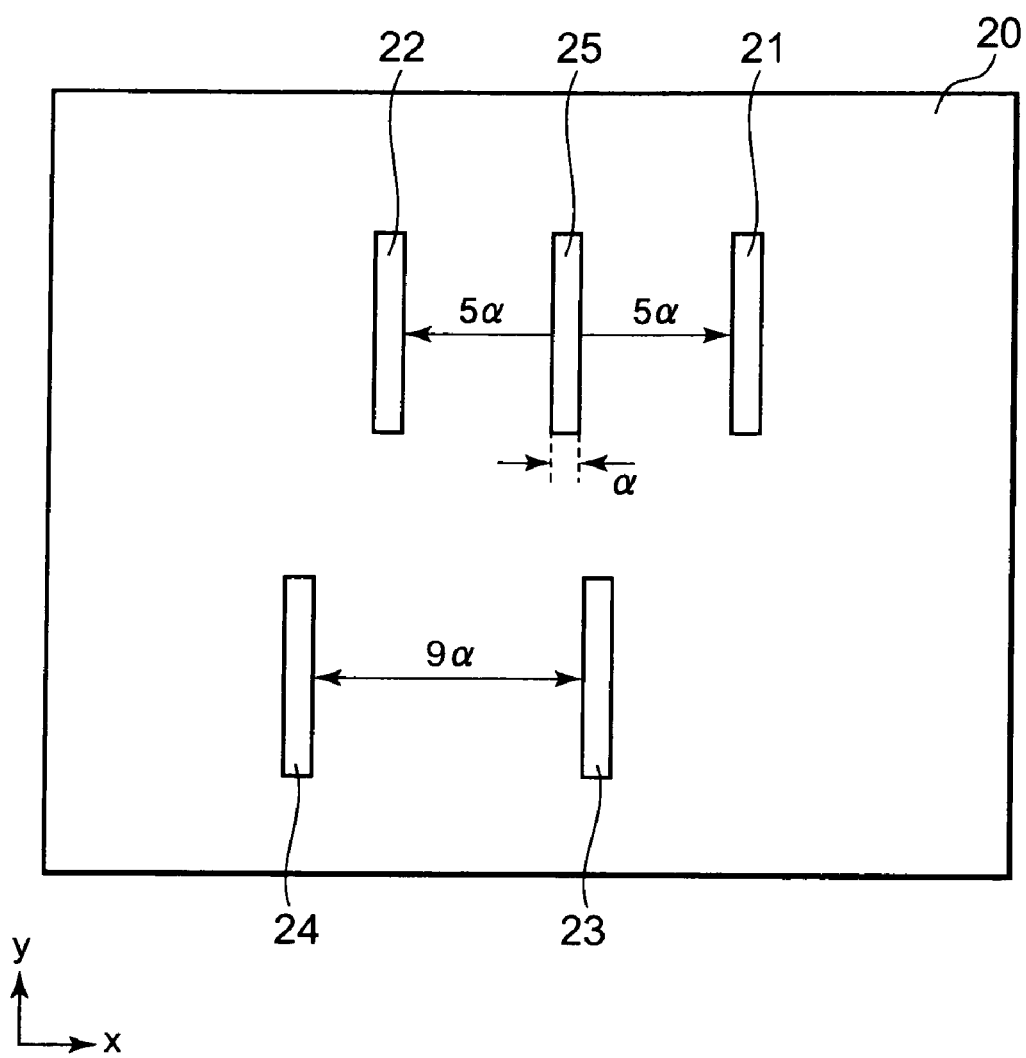
FIG. 16 is an explanatory view for illustrating the operation of the pattern placement apparatus according to the second embodiment of the present invention.

Next, the pattern placement section 60 places a dummy pattern 25 in the placement region 4 as illustrated in FIG. 16 (S4). The dummy pattern 25 is a long island-shaped pattern extending along the y-axis like the wiring patterns 21-24, and is spaced apart by $5\alpha$ from the wiring patterns 21-24 and extends substantially parallel thereto. Moreover, the area of a region occupied by the dummy pattern 5 corresponds to the both area of the placement region 4.

Next, the data ratio check section 53 checks the data ratio concerning the insufficient region 20 after the placement of the dummy pattern 25 (S5). Here, even if the dummy pattern 25 of a width $\alpha$ is placed between the wiring pattern 21 and the wiring pattern 22, the data ratio of the insufficient region 20 still does not satisfy a predetermined data ratio. Accordingly, the flow moves to a cycle from S5 to S8.

Figure 17:
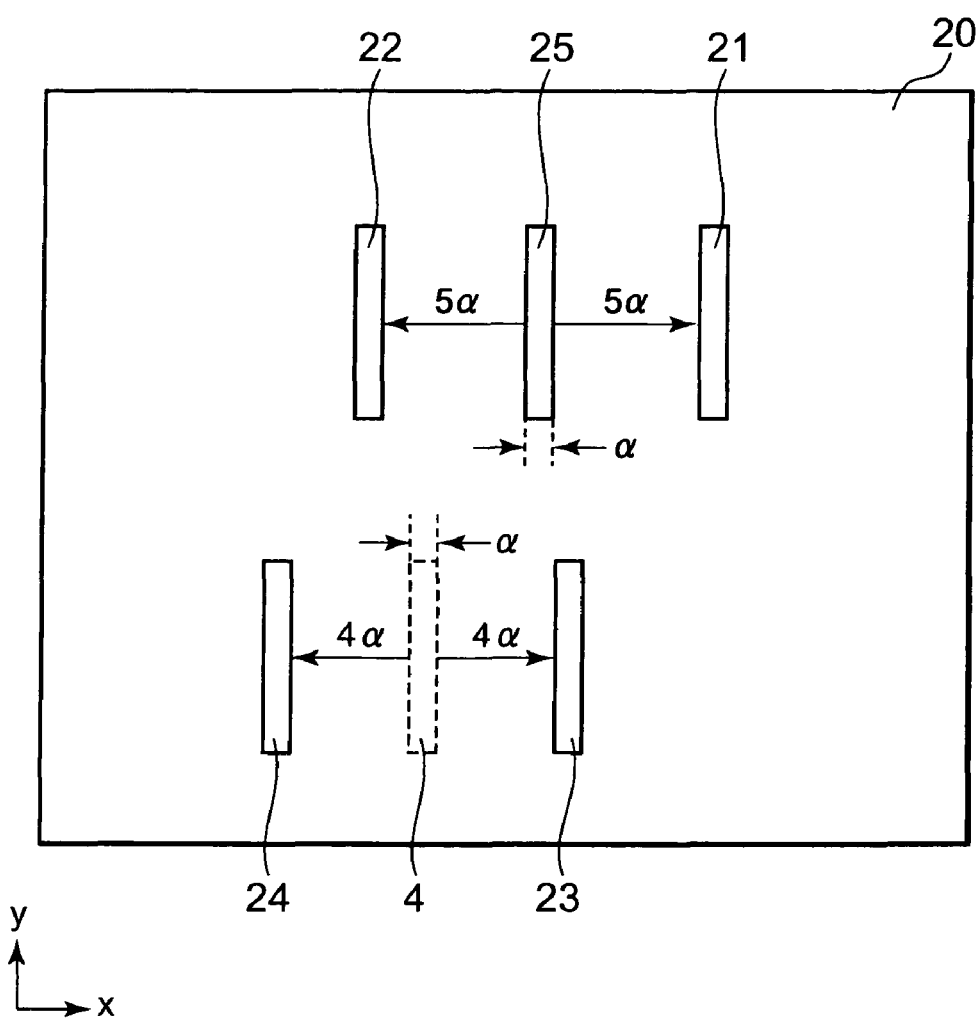
FIG. 17 is an explanatory view for illustrating the operation of the pattern placement apparatus according to the second embodiment of the present invention.

In S6, the placement region setting section 58 sets the placement region 4 based on the calculation results of S2 (S6). Specifically, the placement region setting section 58 sets the placement region 4 midway between the wiring pattern 23 and the wiring pattern 24 as illustrated in FIG. 17. Moreover, the placement region setting section 58 sets the interval between the placement region 4 and the wiring pattern 23 to $4\alpha$, and sets the interval between the placement region 4 and the wiring pattern 24 to $4\alpha$. The width of the placement region 4 is set to $\alpha$ in accordance with the wiring rule. As apparent from the above description, the placement region setting section 58 sequentially sets the placement region 4 in descending order of the pattern-to-pattern distance that determines the setting range of the placement region 4.

Figure 18:
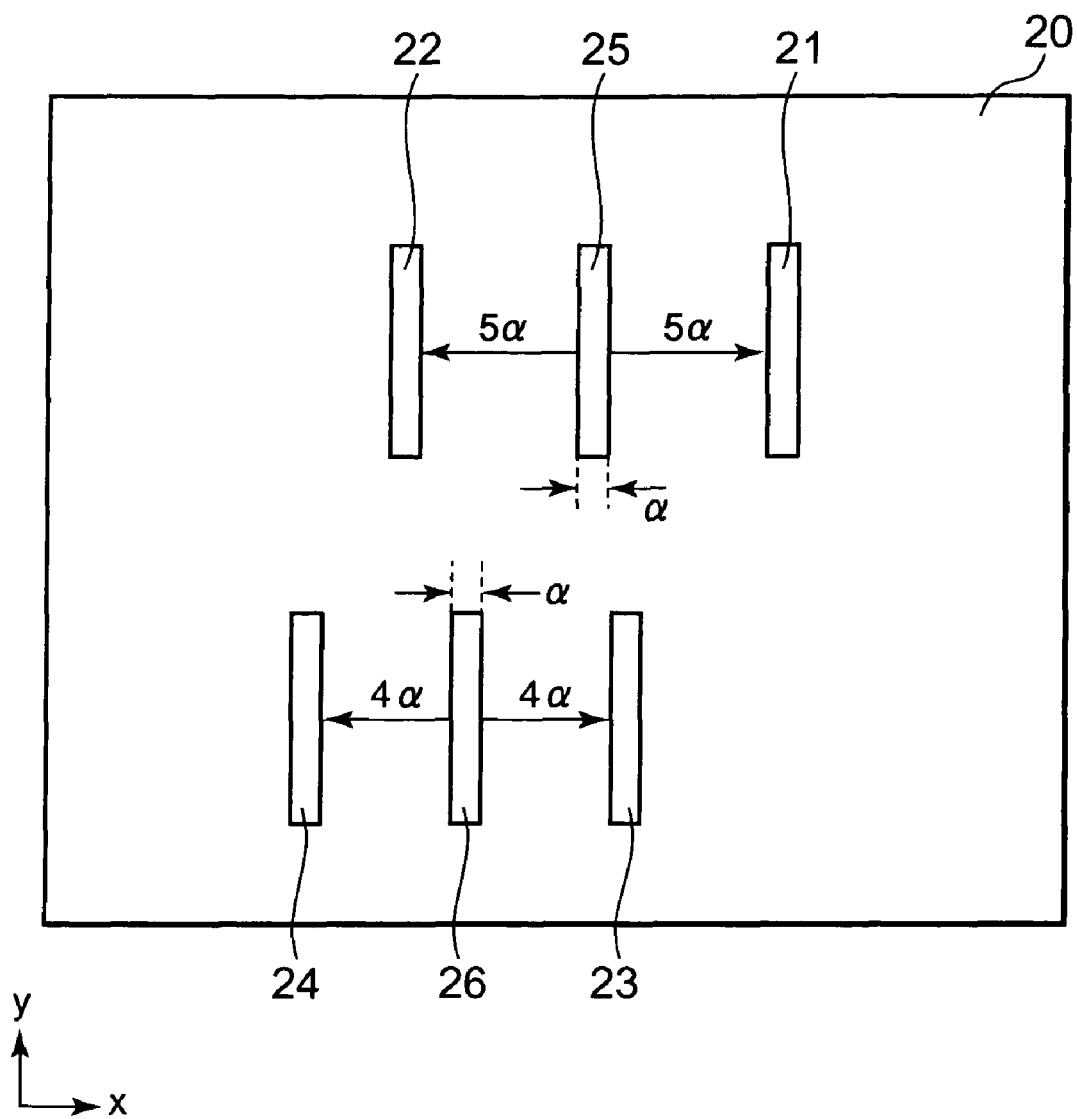
FIG. 18 is an explanatory view for illustrating the operation of the pattern placement apparatus according to the second embodiment of the present invention.

Next, the pattern placement section 60 places a dummy pattern 26 in the placement region 4 as illustrated in FIG. 18 (S4). The dummy pattern 26 is a long island-shaped pattern extending along the y-axis like the wiring patterns 21-24, and is spaced apart by $4\alpha$ from the wiring patterns 21-24 and extends substantially parallel thereto. Moreover, the area of a region occupied by the dummy pattern 26 corresponds to the area of the placement region 4 of FIG. 17.

Figure 19:
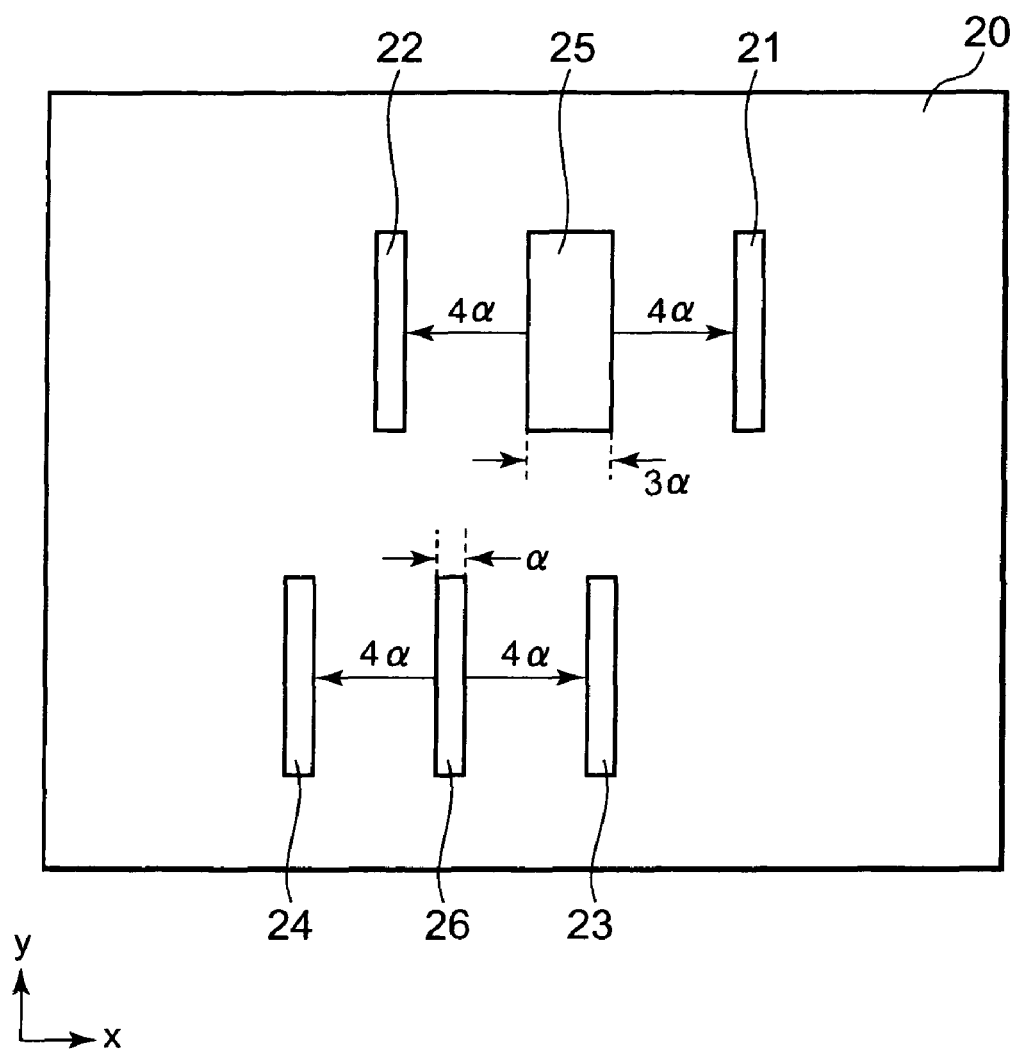
FIG. 19 is an explanatory view for illustrating the operation of the pattern placement apparatus according to the second embodiment of the present invention.

Next, the pattern modification section 61 modifies the placed dummy pattern so that the intervals each between the dummy pattern placed in the insufficient region and the adjacent wiring pattern on either side thereof may be constant (S8). Specifically, the pattern modification section 61 sets the width of the dummy pattern 25 to $3\alpha$ as illustrated in FIG. 19. Accordingly, the intervals between the dummy pattern 25 and the wiring patterns 21, 22 can be set equal to the intervals between the dummy pattern 26 and the wiring patterns 23, 24. Thereby, the intervals each between the dummy pattern and the adjacent wiring pattern on either side thereof are substantially constant across the insufficient region 20. In turn, the intervals each between the dummy pattern and the adjacent wiring pattern on either side thereof are substantially constant across the layout region 1.

Next, the data ratio check section 53 checks the data ratio concerning the insufficient region 20 after the placement of the dummy patterns 25, 26 (S5). Here, by placing the dummy pattern 25 of a width $3\alpha$ and the dummy pattern 26 of a width $\alpha$ in the insufficient region 20, the data ratio of the insufficient region 20 satisfies a predetermined data ratio. Hence, the cycle from S5 to S8 is terminated.

S9 corresponds to S6 in the first embodiment. S10 corresponds to S7 in the first embodiment. Hence, the duplicated description is omitted.

As apparent from the above description, in this embodiment, based on the calculation results of the distance between the wiring patterns, a dummy pattern is placed in the intermediate region between the adjacent wiring patterns at substantially constant intervals to the adjacent wiring patterns. Then, the intervals each between the dummy pattern and the adjacent wiring pattern on either side thereof are set substantially constant across the layout region. Accordingly, as in the first embodiment, the optical effects in the photolithography process that occur with the placement of a dummy pattern can be equalized, and the OPC processing (in particular, the bias processing) can be simplified. Moreover, because the variation of the distance between the dummy pattern and the wiring pattern is dissolved, an increase in the data amount of the table, in which the correction values for the bias processing are stored, can be suppressed, and the load of the arithmetic processing can be reduced. Moreover, the capacitance calculation in the STA processing can be also simplified.

Incidentally, the fact that the dummy pattern 5 is placed in the intermediate region between the adjacent wiring patterns 3 at substantially constant intervals to the adjacent wiring patterns 3 may be substantially constant is given by the fact that the placement region 4 is set in the intermediate region between the adjacent wiring patterns 3 at substantially constant intervals to the adjacent wiring patterns 3.

Moreover, in this embodiment, the dummy pattern is placed in descending order of the distance between wiring patterns. Accordingly, the dummy pattern can be placed in a position spaced apart from the wiring patterns. Then, as described in the first embodiment, the reduction in parasitic capacitance, the prevention of connection of an additional capacitance due to dust, and the like can be achieved.

Moreover, in this embodiment, the distance between wiring patterns is calculated in a direction perpendicular to the extending direction of the wiring pattern. Thus, a dummy pattern can be placed so as to sufficiently compensate for insufficiency of the data ratio.

Note that, also in this embodiment, as in the first embodiment, the dummy pattern is placed after setting the insufficient region, and therefore a reduction in the time required in the dummy pattern placement step can be achieved.

Third Embodiment

Figure 20:
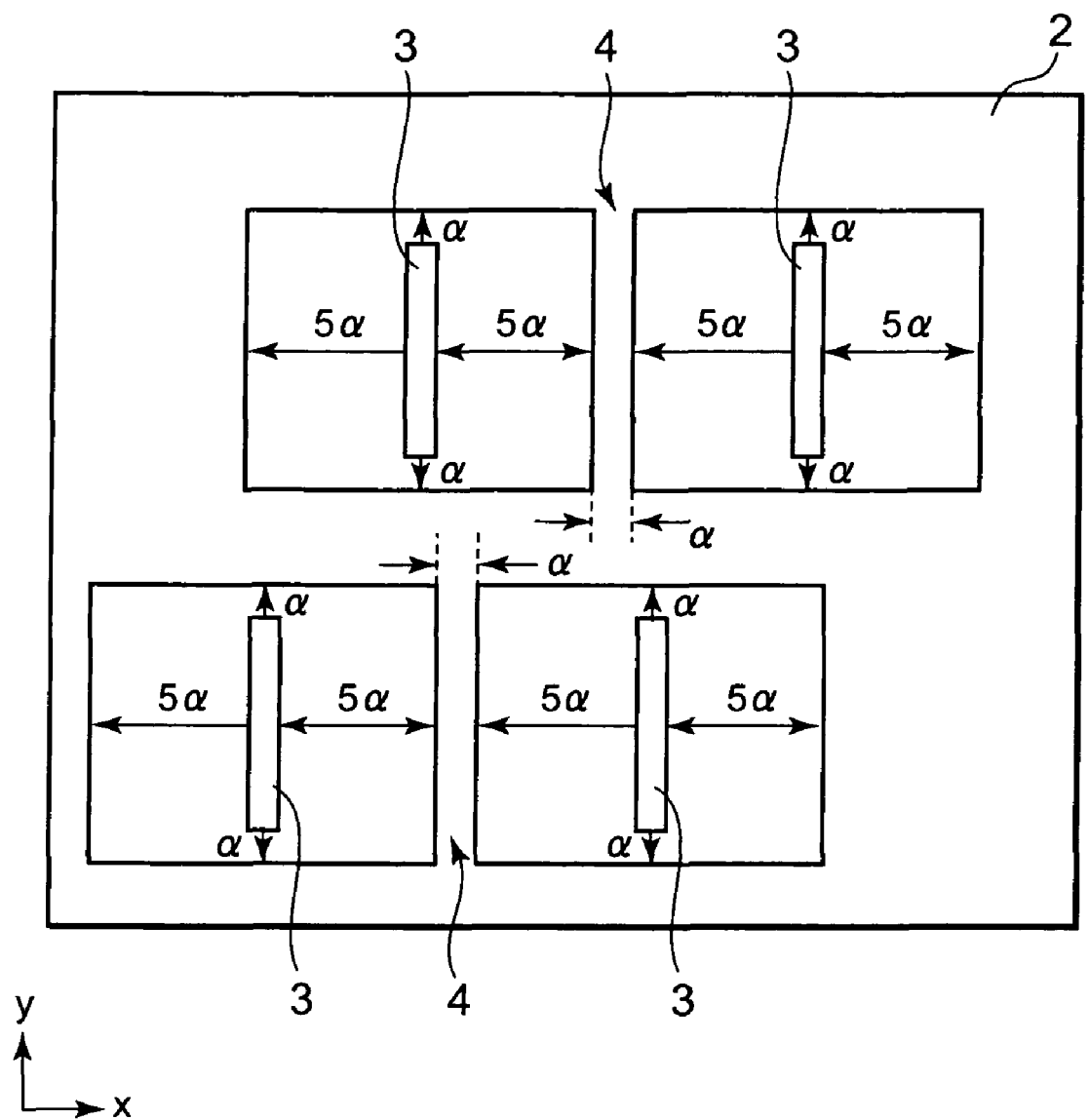
FIG. 20 is an explanatory view for illustrating the operation of a pattern placement apparatus according to a third embodiment of the present invention.
Figure 21:
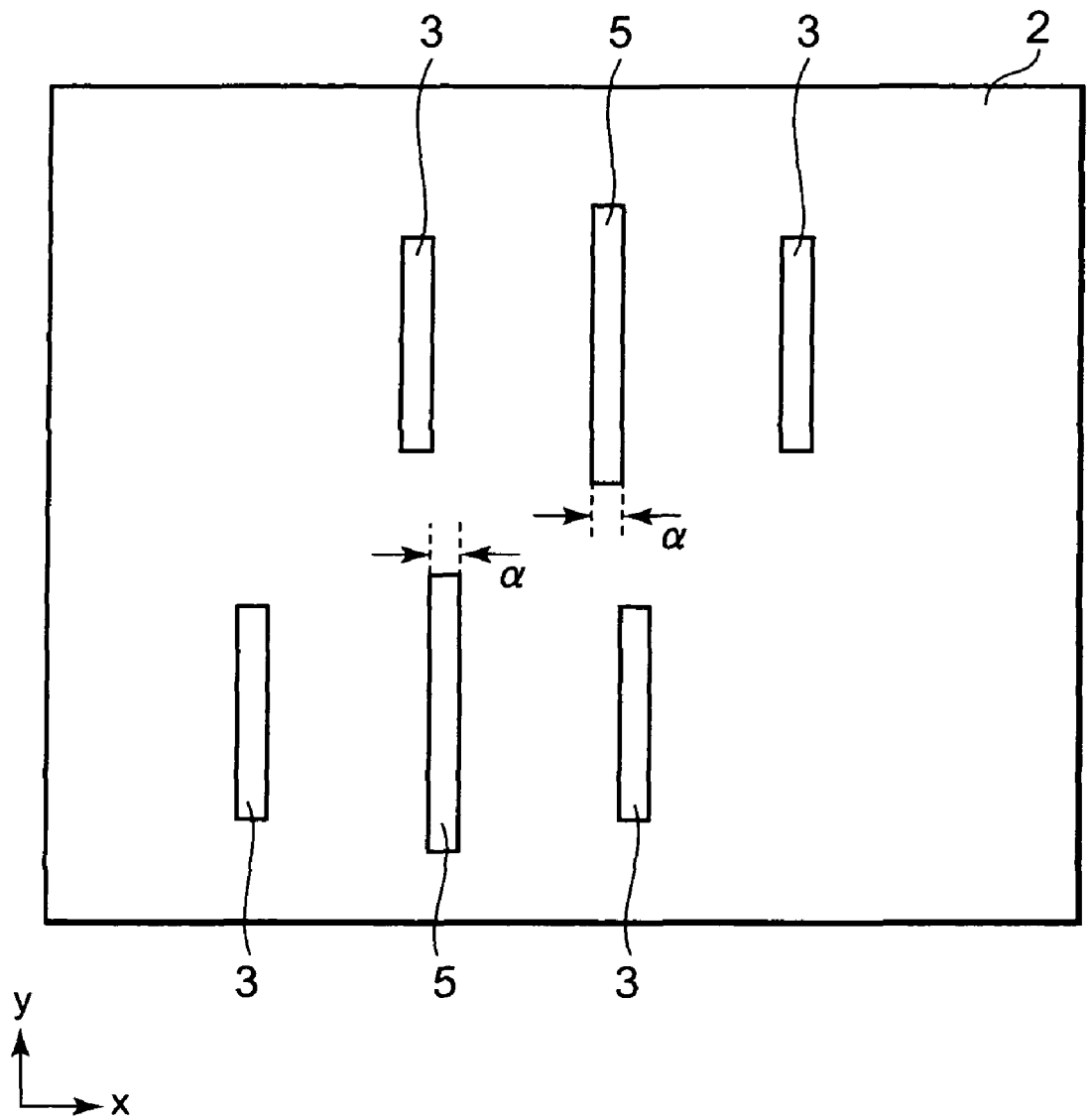
FIG. 21 is an explanatory view for illustrating the operation of the pattern placement apparatus according to the third embodiment of the present invention.

A third embodiment of the present invention is described with reference to FIG. 20 and FIG. 21. FIG. 20 and FIG. 21 are explanatory views for illustrating the operation of a pattern placement apparatus. FIG. 20 corresponds to FIG. 5 of the first embodiment and FIG. 21 corresponds to FIG. 6 of the first embodiment.

In this embodiment, unlike the first embodiment, the pattern modification section 54 sets the width along the y-axis of the wiring pattern 3 to be thick in addition to setting the width along the x-axis of the wiring pattern 3 to be thick. In other words, the pattern modification section 54 sets the wiring pattern 3 to be a wider and longer one. In this case, the placement region 4 to be set can be set to be a wider one. Placement of the dummy pattern 5 in a wider placement region 4 makes it possible to dissolve the insufficiency of the data ratio more effectively. Note that the effects described in the first embodiment also hold true of this embodiment.

As illustrated in FIG. 20, in addition to the movements of the left side and the right side of the wiring pattern 3, the upper side (a first side edge) of the wiring pattern 3 is moved upwards by a when looking at the figure while the lower side (a second side edge) of the wiring pattern 3 is moved downward by a when looking at the figure. Actually, the wiring pattern 3 is modified based on the coordinate operation of the sides of the wiring pattern 3.

By expanding the wiring pattern 3 also in the vertical directions in addition to the horizontal directions, the placement region 4 can be extended by 2α and thus the area of the placement region 4 can be increased by this amount. Then, as shown in FIG. 21, the longer dummy pattern 5 can be placed in the intermediate region between the wiring patterns 3. This makes it possible to compensate for the insufficiency of the data ratio more effectively.

Fourth Embodiment

Figure 22:
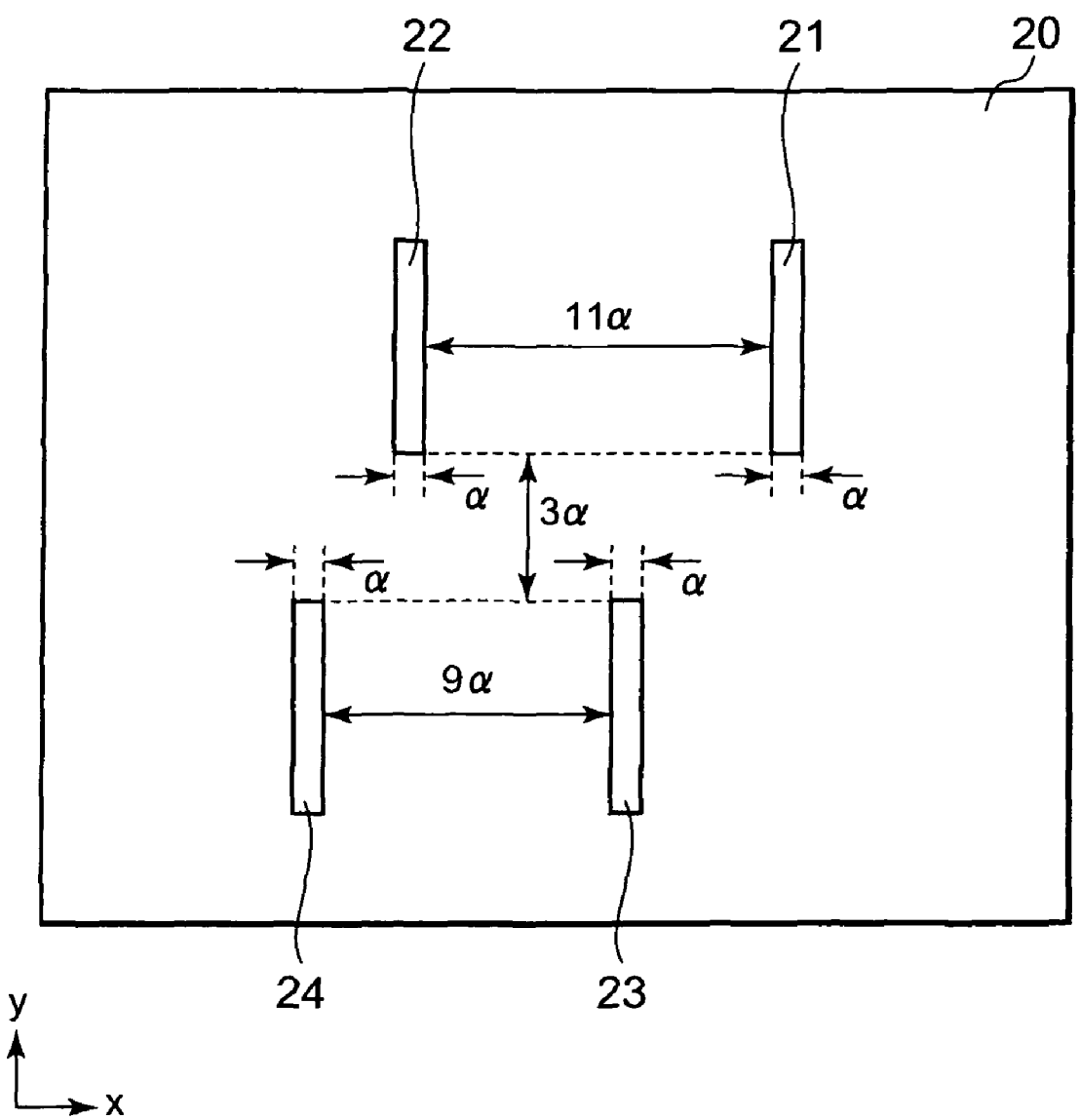
FIG. 22 is an explanatory view for illustrating the operation of a pattern placement apparatus according to a fourth embodiment of the present invention.
Figure 23:
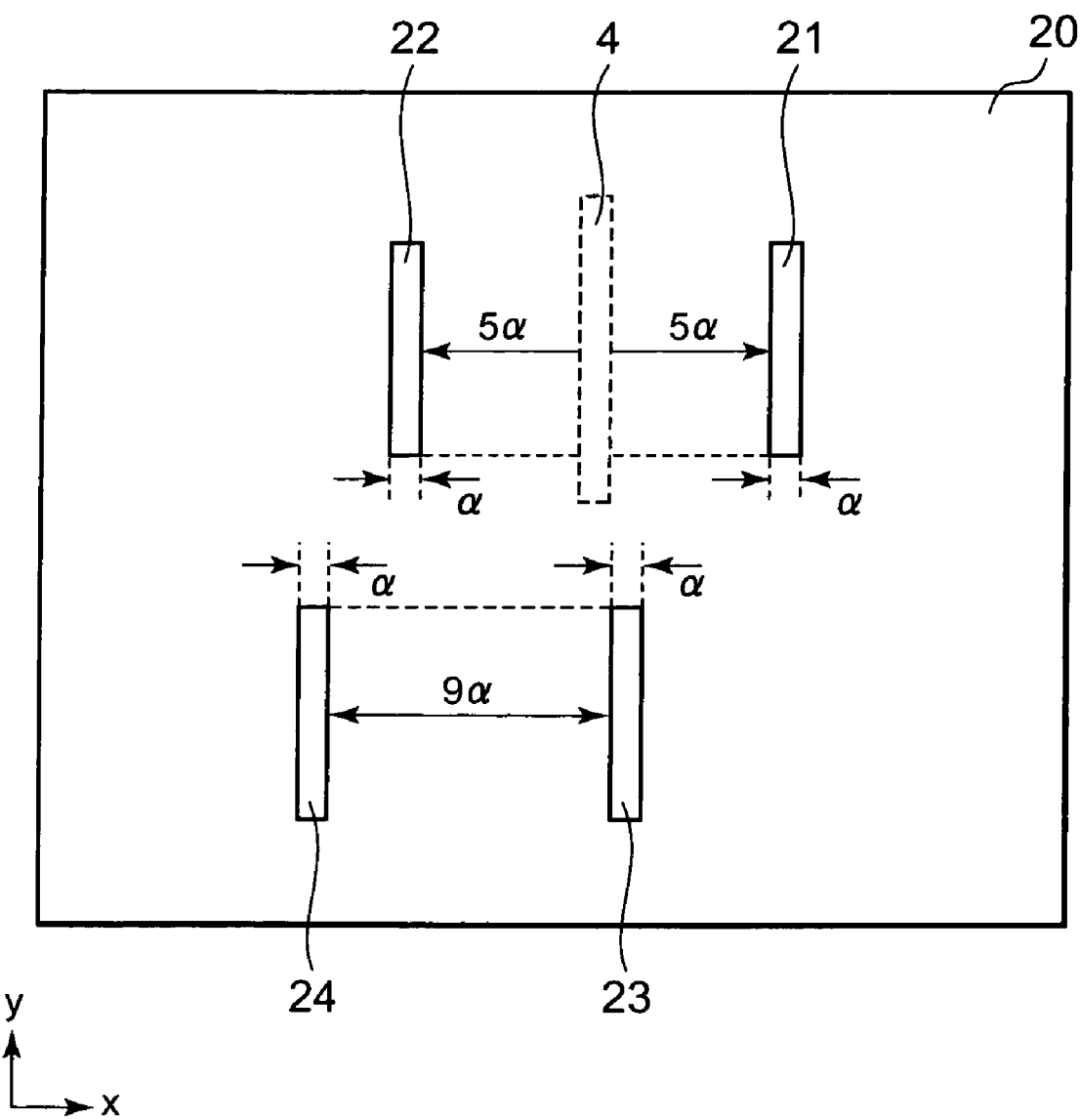
FIG. 23 is an explanatory view for illustrating the operation of the pattern placement apparatus according to the fourth embodiment of the present invention.

A fourth embodiment of the present invention is described with reference to FIG. 22 and FIG. 23. FIG. 22 and FIG. 23 are explanatory views for illustrating the operation of a pattern placement apparatus. FIG. 22 corresponds to FIG. 14 of the second embodiment and FIG. 23 corresponds to FIG. 15 of the second embodiment.

In this embodiment, unlike the second embodiment, the pattern-to-pattern distance calculation section 59 calculates also a distance of the wiring patterns 3 in the vertical direction when looking at the figure. Then, the placement region setting section 58 sets the placement region 4 based on the calculation results of the pattern-to-pattern distance calculation section 59. Accordingly, the placement region 4 can be set in a wider range and the insufficiency of the data ratio can be compensated more effectively. The effects described in the second embodiment also hold true of this embodiment.

As illustrated in FIG. 22, in addition to the intervals between the adjacent wiring patterns along the x-axis, the pattern-to-pattern distance calculation section 59 also calculates the intervals between the adjacent wiring patterns along the y-axis. That is, the pattern-to-pattern distance calculation section 59 also calculates the distance between the wiring patterns 21, 22 and the wiring patterns 23, 24. Here, as shown in FIG. 22, the interval between the wiring patterns along the y-axis is 3α. Then, as illustrated in FIG. 23, the placement region setting section 58 sets the placement region 4 according to the interval 3α between the wiring patterns along the y-axis. This makes it possible to set the placement region 4 of a wider range as compared with the case of the second embodiment. For example, the length along the y-axis of the placement region 4 can be extended by 2α. As a result, the insufficiency of the data ratio can be compensated more effectively.

The technical scope of the present invention is not limited to the above-described embodiments. The method of setting a placement region is not limited to the methods that are carried out based on the modification of the wiring pattern and the calculation of a distance between the wiring patterns. Moreover, the placement procedure of a dummy pattern does not necessarily need to be carried out following the procedure shown in the flowcharts. The specific forms of the wiring pattern and the dummy pattern are selected arbitrarily.

It is apparent that the present invention is not limited to the above embodiments, but may be modified and changed without departing from the scope and sprit of the invention.

What is claimed is:

1. A dummy pattern placement apparatus for layout design of a semiconductor integrated circuit, comprising:
    a placement region setting section setting a dummy pattern placement region, the dummy pattern placement region being an intermediate region between adjacent wiring patterns and a substantially equidistant region from both of the adjacent wiring patterns; and
    a pattern placement section placing the dummy pattern in the dummy pattern placement region, an area of the placed dummy pattern being equal to an area of the dummy pattern placement region, and
    wherein the placement region setting section sets the dummy pattern placement region by temporarily widening widths of the adjacent wiring patterns using a plurality of scale factors in descending order.

* * * * *